(12) United States Patent
Minamisawa

(10) Patent No.: US 10,634,928 B2
(45) Date of Patent: Apr. 28, 2020

(54) METHOD FOR ADJUSTING POSITION OF SWING MEMBER OF OPTICAL UNIT WITH SHAKE CORRECTION FUNCTION AND OPTICAL UNIT WITH SHAKE CORRECTION FUNCTION

(71) Applicant: NIDEC SANKYO CORPORATION, Nagano (JP)

(72) Inventor: Shinji Minamisawa, Nagano (JP)

(73) Assignee: NIDEC SANKYO CORPORATION, Nagano (JP)

( * ) Notice: Subject to any disclaimer, the term of this patent is extended or adjusted under 35 U.S.C. 154(b) by 155 days.

(21) Appl. No.: 16/034,326

(22) Filed: Jul. 12, 2018

(65) Prior Publication Data

US 2019/0018260 A1 Jan. 17, 2019

(30) Foreign Application Priority Data

Jul. 13, 2017 (JP) .................................. 2017-136860

(51) Int. Cl.
| | |
|---|---|
| *G02B 27/64* | (2006.01) |
| *G03B 5/00* | (2006.01) |
| *G02B 7/02* | (2006.01) |
| *G02B 7/00* | (2006.01) |

(52) U.S. Cl.
CPC ........... *G02B 27/646* (2013.01); *G02B 7/005* (2013.01); *G02B 7/023* (2013.01); *G03B 5/00* (2013.01); *G03B 2205/0007* (2013.01); *G03B 2205/0023* (2013.01); *G03B 2205/0069* (2013.01)

(58) Field of Classification Search
CPC .. G02B 27/64; G02B 27/646; H04N 5/23248; H04N 5/23264; H04N 5/2328; H04N 5/23287
USPC ....... 359/554, 557; 250/201.1, 201.2, 201.4; 348/208.99, 208.2, 208.12; 396/52, 55
See application file for complete search history.

(56) References Cited

U.S. PATENT DOCUMENTS

| | | | | |
|---|---|---|---|---|
| 2018/0284569 A1* | 10/2018 | Minamisawa | ....... | G02B 27/646 |
| 2018/0284570 A1* | 10/2018 | Minamisawa | ....... | H04N 5/2253 |
| 2018/0321462 A1* | 11/2018 | Minamisawa | ......... | H02K 21/24 |
| 2018/0321505 A1* | 11/2018 | Minamisawa | ....... | G02B 27/646 |
| 2018/0321506 A1* | 11/2018 | Minamisawa | ....... | G02B 27/646 |
| 2019/0018258 A1* | 1/2019 | Minamisawa | ....... | H04N 5/2257 |
| 2019/0018259 A1* | 1/2019 | Minamisawa | ........... | G03B 5/06 |

FOREIGN PATENT DOCUMENTS

JP          2015064501          4/2015

\* cited by examiner

*Primary Examiner* — Arnel C Lavarias
(74) *Attorney, Agent, or Firm* — JCIPRNET

(57) ABSTRACT

Regarding an optical unit, a swing driving magnet is held at a holding area of a fixed member in such a manner that the swing driving magnet is movable, and a position-recovering magnetic member is held on a movable unit at a position where the position-recovering magnetic member is able to face the swing driving magnet (Step ST1). Next, a deviated amount between the axis line of the optical unit and the optical axis of an optical module is obtained (Step ST2). Then, the swing driving magnet is moved.

14 Claims, 17 Drawing Sheets

METHOD FOR ADJUSTING POSITION OF SWING MEMBER OF OPTICAL UNIT WITH SHAKE CORRECTION FUNCTION AND OPTICAL UNIT WITH SHAKE CORRECTION FUNCTION

CROSS REFERENCE TO RELATED APPLICATIONS

This application claims the priority benefit of Japanese Patent Application No. 2017-136860, filed on Jul. 13, 2017. The entirety of the above-mentioned patent application is hereby incorporated by reference herein and made a part of this specification.

BACKGROUND

Field of the Disclosure

The disclosure relates to an optical unit with shake correction, which is mounted in a cellular phone, a mobile object, etc.

Description of the Related Documents

Some optical units, which are mounted on a mobile object such as a cellular phone, a vehicle or an unmanned helicopter, include a shake correction function, which causes an optical element to swing and correct shake in order to reduce fuzziness in a captured image, which is caused by swing of the optical unit. The optical unit with a shake correction function according to Japanese Unexamined Patent Application Publication No. 2015-64501 includes: a swing member provided with an optical element; a swing-supporting mechanism configured to support the swing member such that the swing member is able to swing; a fixed member configured to support the swing member from the outer circumferential side via the swing-supporting mechanism; and a swing magnetic driving mechanism configured to cause the swing member to swing. The swing-supporting mechanism supports the swing member such that the swing member is able to swing in a range between a reference position, in which a predetermined axis line corresponds to the optical axis of the optical element, and a tilting position, in which the optical axis tilts relative to the axis line. The swing magnetic driving mechanism includes; a coil that is held by the swing member; and a magnet that is fixed to the fixed member and is opposed to the coil. The magnet is magnetized in such a manner that the magnet is polarized in two in an axis line direction The optical unit with a shake correction function according to Japanese Unexamined Patent Application Publication No. 2015-64501 includes a plate spring for defining a reference position of the swing member. The plate spring bridges between the swing member and the fixed member. Further, the plate spring includes: a swing-member-side fixation part that is fixed to the swing member; a fixed-member-side fixation part that is fixed to the fixed member; and a winding part that winds between the swing-member-side fixation part and the fixed-member-side fixation part.

Patent Literature: Japanese Unexamined Patent Application Publication No. 2015-64501

The winding part of the plate spring is formed in a thin shape in order to receive swing by the swing member against the fixed member, and therefore is subject to plastic deformation. Therefore, it is not easy to handle the plate spring. Further, the process of bridging the plate spring between the swing member and the fixed member for manufacturing the optical unit with a shake correction function is not easy either. Furthermore, in a case of excessive displacement of the swing member due to an external impact against the optical unit with a shake correction function, plastic deformation of the winding part may occur as well. Here, leaving out the plate spring from the swing member may be considered. However, in a case of leaving out the plate spring, there is a problem that the reference position of the swing member cannot be defined.

In view of the above problem, the disclosure is to suggest a method for adjusting a position of a swing member of an optical unit with a shake correction function, in which it is possible to define a reference position of the swing member without bridging a plate spring for position-recovering between the swing member and a fixed member. Furthermore, another object is to provide an optical unit with a shake correction function, in which it is possible to define a reference position of a swing member.

SUMMARY

An embodiment of the disclosure provides a method for adjusting a position of a swing member of an optical unit with a shake correction function. The optical unit includes: the swing member including an optical element; a swing-supporting mechanism configured to support the swing member in such a manner that the swing member is able to swing between a reference position, in which a predetermined axis line and an optical axis of the optical element correspond to each other, and a tilting position, in which the optical axis tilts relative to the axis line by a predetermined angle, a supporting member configured to support the swing member via the swing-supporting mechanism; a swing magnetic driving mechanism configured to cause the swing member to swing; and a fixed member configured to enclose the swing member from an outer circumferential side. Further, the swing magnetic driving mechanism includes a coil and a magnet, the coil being fixed to either one of the swing member and the fixed member, the magnet being held by the other one of the swing member and the fixed member. Further, the magnet is magnetized in such a manner that the magnet is polarized in two in an axis line direction. Further, the method includes: holding a magnetic member on one of the swing member and the fixed member where the coil being fixed to and at a position that overlaps the magnet when seen in a radial direction orthogonal to the axis line; moving the magnetic member or the magnet in the axis line direction, so as to cause the optical axis and the axis line to correspond to each other; and fixing the magnetic member or the magnet to a position to which the magnetic member or the magnet has been moved.

In an embodiment of the disclosure, a magnetic member is held by one of the swing member and the fixed member, to which the coil of the swing magnetic driving mechanism is fixed, at a position that overlaps the magnet of the swing magnetic driving mechanism when seen in a radial direction. Here, between the magnetic member and the magnet, magnetic attractive force is exerted in such a direction that causes the center of the magnetic member to correspond to the magnetization-polarized line of the magnet. Therefore, when the magnetic member or the magnet is moved in the axis line direction, the position of the swing member is displaced due to the magnetic attractive force exerted between the magnetic member and the magnet. Hence, by adjusting such that the optical line of the swing member and the axis line correspond to each other and then fixing the moved magnetic member or magnet to a position to which the magnetic member or magnet is moved, it is possible to define a reference position.

In an embodiment of the disclosure, it is preferable that: the magnet is held on the fixed member; and the magnet is moved in the axis line direction, so as to cause the optical axis of the swing member and the axis line to correspond to each other. That is to say, it is easier to move the magnet held by a member (i.e., the fixed member) that is fixed rather than moving the magnetic member held by a swingable member (i.e., the swing member). Furthermore, as the magnet of the swing magnetic driving mechanism is relatively large, it is easy to move the magnet by using a jig, etc., abutting the magnet.

In an embodiment of the disclosure, it is preferable that: the fixed member includes a cylinder member made of magnetic material and enclosing the swing member from an outer side of the radial direction, the cylinder member including, on an inner wall surface facing the swing member, a holding area that holds the magnet in such a manner that the magnet is able to move in the axis line direction; and the magnet is held inside the holding area and is moved in the axis line direction, so as to cause the optical axis of the swing member and the axis line to correspond to each other. In this case, as the magnet is magnetically attracted by the cylinder member, it is easy to move the magnet inside the holding area. Furthermore, in this case, the cylinder member functions as a back yoke when the magnet is held by the holding area. Hence, it is possible to enhance torque generated by the swing magnetic driving mechanism.

In an embodiment of the disclosure, it is preferable that: the cylinder member includes a radial-direction-opening part that penetrates through the cylinder member in the radial direction; and a first jig is inserted from the radial-direction-opening part to an inside of the cylinder member and is moved while the first jig is abutting the magnet, so as to move the magnet in the axis line direction. In this case, it is easy to move the magnet, which is held on the inner wall surface of the cylinder member, in the axis line direction.

Furthermore, in an embodiment of the disclosure, it is possible that: the cylinder member includes a cylinder part provided with the holding area and the radial-direction-opening part and a frame part protruding inward from one of axis-direction-edges of the cylinder part; the frame part includes an axis-direction-opening part at a position facing the magnet, which is held in the holding area, in the axis line direction; and a second jig is inserted from the axis-direction-opening part to the cylinder part and is moved while the second jig is abutting the magnet, so as to move the magnet in the axis line direction. In a case where the cylinder part includes the frame part, it is possible that a case, etc., for protecting the swing member is attached to one of the axis-direction-sides of the cylinder part by use of the frame part. Furthermore, by providing the frame part with the axis-direction-opening part, it is possible that the magnet is abutted by a jig from the axis line direction through the axis-direction-opening part even though there is the frame part. Therefore, it is easy to move the magnet in the axis line direction.

In an embodiment of the disclosure, it is possible that: the swing magnetic driving mechanism includes a first swing magnetic driving mechanism and a second swing magnetic driving mechanism, which are disposed on sides with the axis line therebetween; the magnetic member includes a first magnetic member and a second magnetic member, the first magnetic member being held by one of the swing member and the fixed member where the coil of the first swing magnetic driving mechanism being fixed and at a position that overlaps the magnet of the first swing magnetic driving mechanism when seen in the radial direction, the second magnetic member being held by one of the swing member and the fixed member where the coil of the second swing magnetic driving mechanism being fixed and at a position that overlaps the magnet of the second swing magnetic driving mechanism when seen in the radial direction; and the magnet of the first swing magnetic driving mechanism or the first magnetic member is moved in the axis line direction and the magnet of the second swing magnetic driving mechanism or the second magnetic member is moved in the axis line direction, so as to cause the optical axis of the swing member and the axis line to correspond to each other. In this case, there are configured, on both sides with the axis line therebetween, two pairs of a magnetic member and a magnet for defining the reference position of the swing member. Further, when adjusting the position of the swing member by moving the magnet or the magnetic member, the moving direction of the magnet or the first magnetic member, which is positioned on one side of the axis line, may be in the opposite direction of the moving direction of the magnet or the second magnetic member, which is positioned on the other side of the axis line. In this way, it is possible to stabilize the reference position of the swing member because of magnetic attractive force between the magnet and the first magnetic member, which are on one side of the axis line, and magnetic attractive force between the magnet and the second magnetic member, which are on the other side of the axis line.

In an embodiment of the disclosure, it is possible that: the swing magnetic driving mechanism includes a third swing magnetic driving mechanism and a fourth swing magnetic driving mechanism, the third swing magnetic driving mechanism being disposed at an angular position around the axis line between the first swing magnetic driving mechanism and the second swing magnetic driving mechanism, the fourth swing magnetic driving mechanism being disposed on an opposite side of the third swing magnetic driving mechanism with the axis line therebetween; the magnetic member includes a third magnetic member and a fourth magnetic member, the third magnetic member being held by one of the swing member and the fixed member where the coil of the third swing magnetic driving mechanism being fixed and at a position that overlaps the magnet of the third swing magnetic driving mechanism when seen in the radial direction, the fourth magnetic member being held by one of the swing member and the fixed member where the coil of the fourth swing magnetic driving mechanism being fixed and at a position that overlaps the magnet of the fourth swing magnetic driving mechanism when seen in the radial direction; and the magnet of the third swing magnetic driving mechanism or the third magnetic member is moved in the axis line direction and the magnet of the fourth swing magnetic driving mechanism or the fourth magnetic member is moved in the axis line direction, so as to cause the optical axis of the swing member and the axis line to correspond to each other. In this case, it is possible to adjust the position of the swing member with respect to four directions around the axis line.

In an embodiment of the disclosure, it is possible that the fixed member doubles as the supporting member. In other words, it is possible to leave out the supporting member and that the fixed member, which holds the coil or the magnet of the swing magnetic driving mechanism, supports the swing member via the swing supporting mechanism.

Next, an optical unit with a shake correction function according to an embodiment of the disclosure includes: a swing member including an optical element; a swing-supporting mechanism configured to support the swing member in such a manner that the swing member is able to swing between a reference position, in which a predetermined axis line and an optical axis of the optical element correspond to each other, and a tilting position, in which the optical axis tilts relative to the axis line by a predetermined angle; a supporting member configured to support the swing member via the swing-supporting mechanism; a swing magnetic driving mechanism configured to cause the swing member to swing; and a fixed member configured to enclose the swing member from an outer circumferential side. Further, the swing magnetic driving mechanism includes a coil and a magnet, the coil being fixed to either one of the swing member and the fixed member, the magnet being held by the other one of the swing member and the fixed member. Further, the magnet is magnetized in such a manner that the magnet is polarized in two in an axis line direction. Further, the fixed member includes a cylinder member made of magnetic material and enclosing the swing member from an outer side. Further, the cylinder member includes, on an inner wall surface facing the swing member, a holding area that holds the magnet in such a manner that the magnet is able to move in the axis line direction and a radial-direction-opening part that allows a first jig to abut the magnet held by the holding area from an outside of the cylinder member.

In an embodiment of the disclosure, regarding the swing member and the fixed member, a magnetic member is held by the swing member, to which the coil of the swing magnetic driving mechanism is fixed, at a position that overlaps the magnet of the swing magnetic driving mechanism when seen in a radial direction. Additionally, the cylinder part of the fixed member is made of magnetic material and includes: a holding area that holds the magnet in such a manner that the magnet is able to move in the axis line direction; and a radial-direction-opening part. Therefore, it is possible to move the magnet, which is magnetically attracted by the cylinder part, in the axis line direction, by moving a jig, which is inserted from the radial-direction-opening part to the inside of the cylinder part to abut the magnet. Here, between the magnetic member and the magnet, magnetic attractive force is exerted in such a direction that causes the center of the magnetic member to correspond to the magnetization-polarized line of the magnet. Therefore, when the magnetic member or the magnet is moved in the axis line direction, the position of the swing member is displaced due to the magnetic attractive force exerted between the magnetic member and the magnet. Hence, it is possible to define a reference position.

In an embodiment of the disclosure, it is possible that: the cylinder member includes a cylinder part provided with the holding area and the radial-direction-opening part, a frame part protruding inward from one of axis-direction-edges of the cylinder part, and an axis-direction-opening part that allows a second jig to abut the magnet held by the holding area from the outside of the cylinder member; and the axis-direction-opening part is provided on the frame part at a position facing the magnet, which is held in the holding area, in the axis line direction. In a case where the cylinder part includes the frame part, it is possible that a case, etc., for protecting the swing member is attached to one of the axis-direction-sides of the cylinder part by use of the frame part. Furthermore, by providing the frame part with the axis-direction-opening part, it is possible that the magnet is abutted by a jig from the axis line direction through the axis-direction-opening part even though there is the frame part. Therefore, it is easy to move the magnet in the axis line direction.

In an embodiment of the disclosure, it is possible that the fixed member doubles as the supporting member. In other words, it is possible to leave out the supporting member and that the fixed member, which holds the coil or the magnet of the swing magnetic driving mechanism, supports the swing member via the swing supporting mechanism.

In the method for adjusting a position of a swing member of an optical unit with a shake correction function, regarding the optical unit with a shake correction function according to an embodiment of the disclosure, it is possible to define a reference position of a swing member, which supports an optical element, without using a plate spring.

Furthermore, with an optical unit with a shake correction function according to an embodiment of the disclosure, not only it is possible to define a reference position of a swing member, which supports an optical element, without using a plate spring, but also it is easy to define a reference position of a swing member by using jigs.

BRIEF DESCRIPTION OF THE DRAWINGS

Embodiments will now be described, by way of example only, with reference to the accompanying drawings which are meant to be exemplary, not limiting, and wherein like elements are numbered alike in several Figures, in which.

DETAILED DESCRIPTION

Hereinafter, an embodiment of an optical unit 1 to which the disclosure is applied is explained with reference to the drawings. In the present specification, directions of three axes X, Y and Z are orthogonal to each other. Further, one side of the X-axis direction is indicated by +X and the other side is indicated by −X. Further, one side of the Y-axis direction is indicated by +Y and the other side is indicated by −Y. Further, one side of the Z-axis direction is indicated by +Z and the other side is indicated by −Z. The Z-axis direction is an axis line direction of the optical unit and is an optical axis direction of an optical element. The +Z direction is the object side of the optical unit and the −Z direction is the counter-object side (i.e., the image side) of the optical unit.

(Overall Configuration)

Figure 1:
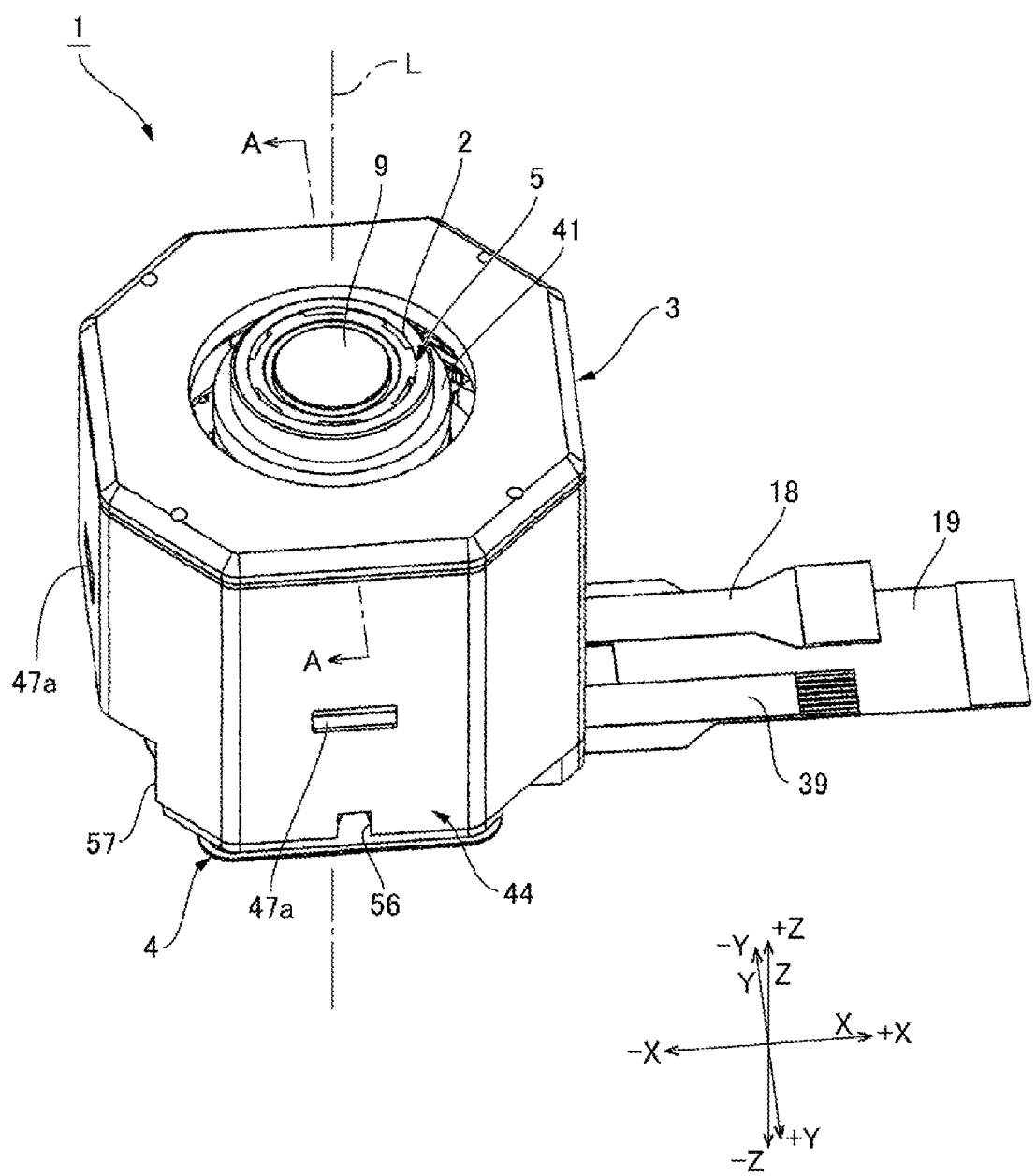
FIG. 1 is a perspective view of an optical unit, to which an embodiment of the disclosure is applied, seen from an object side.
Figure 2:
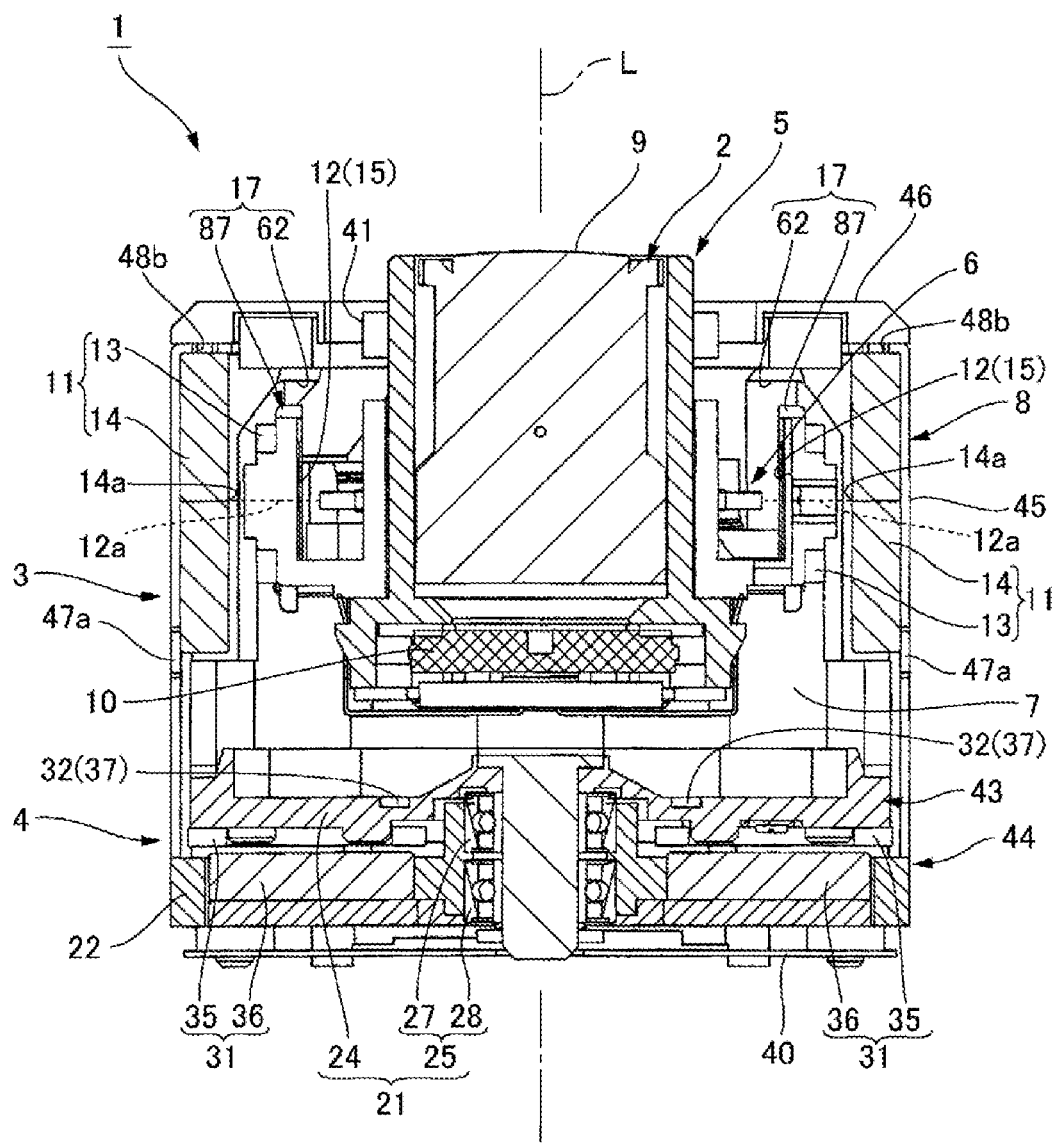
FIG. 2 is a cross-sectional view of the optical unit taken along the line A-A of FIG. 1.
Figure 3:
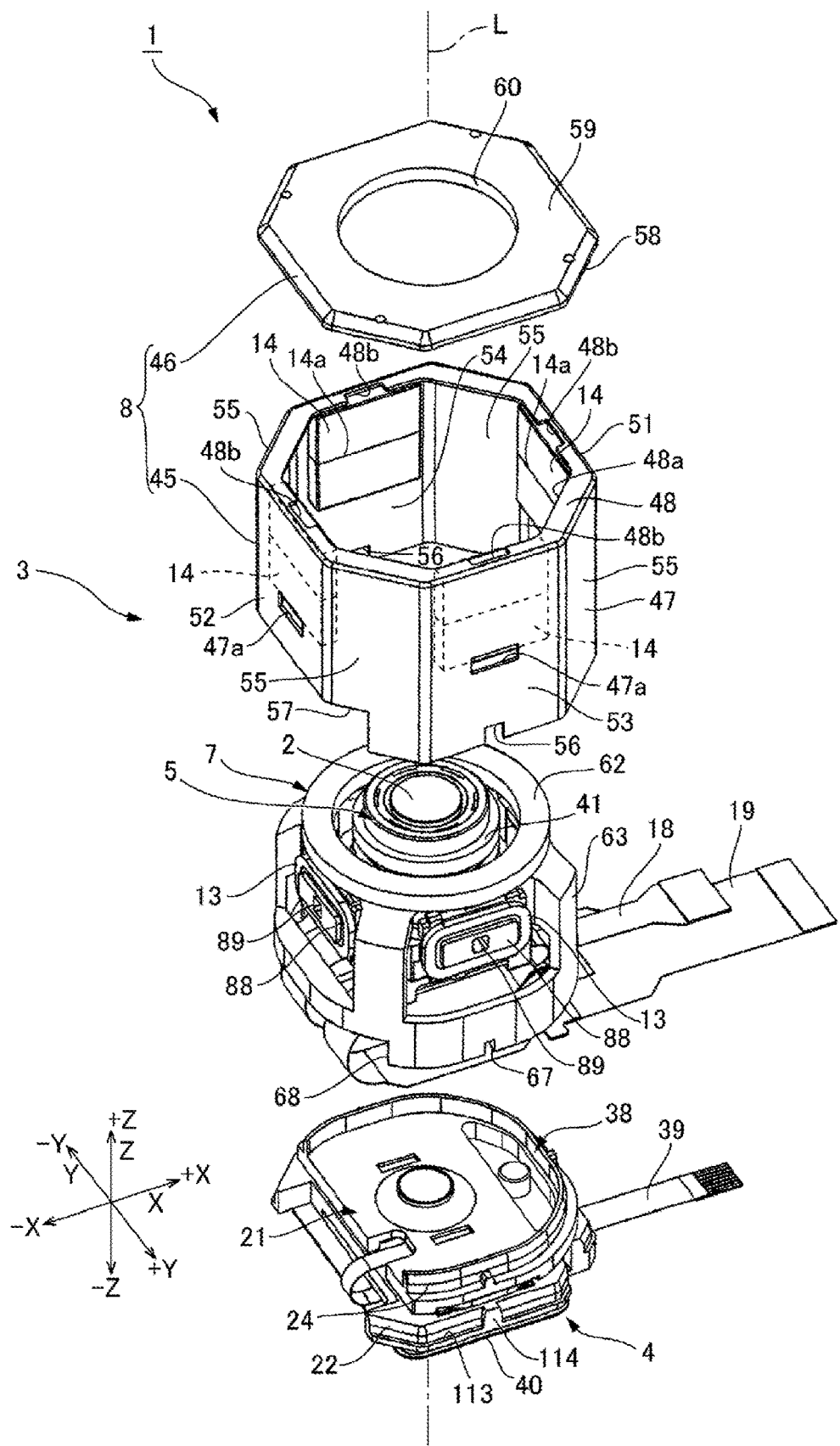
FIG. 3 is an exploded perspective view of the optical unit of FIG. 1 seen from the object side.

FIG. 1 is a perspective view of the optical unit, to which an embodiment of the disclosure is applied, seen from the object side. FIG. 2 is a cross-sectional view of the optical unit taken along the line A-A of FIG. 1. FIG. 3 is an exploded perspective view of the optical unit of FIG. 1 seen from the object side. The optical unit 1 illustrated in FIG. 1 may be utilized for, for example, an optical device such as a cellular phone device with camera or a drive recorder or for an optical device such as an action camera or a wearable camera mounted on a mobile object such as a helmet, a bicycle or a radio control helicopter. Regarding such an optical device, shake of the optical device when capturing an image may cause fuzziness in the captured image. The optical unit 1 in the present embodiment is an optical unit with a shake correction function for correcting tilt and rotation of a mounted optical module 2, in order to prevent a captured image from being fuzzy.

As illustrated in FIG. 2 and FIG. 3, the optical unit 1 includes: a first unit 3 provided with an optical module 2; and a second unit 4 that supports the first unit 3 from the −Z-direction side such the first unit 3 is able to rotate.

As illustrated in FIG. 2, the first unit 3 includes: a movable unit 5 (i.e., a swing member) provided with an optical module 2; a swing-supporting mechanism 6 that supports the movable unit 5 such that the movable unit 5 is able to swing; a holder 7 (i.e., a supporting member) that supports the movable unit 5 from the outer circumferential side via the swing-supporting mechanism 6; and a casing member 8 that encloses the movable unit 5 and the holder 7 from the outer circumferential side. The optical module 2 includes: an optical element 9; and an imaging element 10 arranged on the optical axis of the optical element 9. The swing-supporting mechanism 6 supports the movable unit 5 such that the movable unit 5 is able to swing in a range between a reference position, in which a predetermined axis line L corresponds to the optical axis of the optical element 9, and a tilting position, in which the optical axis tilts relative to the axis line L. The swing-supporting mechanism 6 has a gimbal mechanism. Here, the axis line L corresponds to the Z-axis.

Furthermore, the first unit 3 includes: a swing magnetic driving mechanism 11 that causes the movable unit 5 to swing; and a position-recovering mechanism 12 that causes the movable unit 5, which swings, to recover to the reference position. The swing magnetic driving mechanism 11 includes: a swing driving coil 13 held by the movable unit 5; and a swing driving magnet 14 held by the casing member 8 (i.e., fixed member). The swing driving coil 13 and the swing driving magnet 14 are opposed to each other in the radial direction, which is orthogonal to the axis line L. The position-recovering mechanism 12 includes: the swing driving magnet 14 held by the casing member 8; and a position-recovering magnetic member 15 (i.e., a magnetic member) held by the movable unit 5 such that the position-recovering magnetic member 15 is opposed to the swing driving magnet 14. Note that, as detailed in the following description, the position-recovering mechanism 12 defines the reference position of the movable unit 5 being in a state where the swing magnetic driving mechanism 11 is not driven.

Furthermore, the first unit 3 includes a swing-stopper mechanism 17 that restrains a swing range of the movable unit 5. Furthermore, the first unit 3 includes: a flexible printed circuit board 18 that is electronically connected to the swing driving coil 13; and a flexible printed circuit board 19 that is electronically connected to the imaging element 10. To the movable unit 5, there is attached a weight 41 for causing the center of gravity of the movable unit 5 and the center of swing of the movable unit 5 to correspond to each other.

Next, the second unit 4 includes: a rotation-supporting mechanism 21 that supports the holder 7 such that the holder 7 is able to rotate on the axis line L; and a fixation member 22 that supports the holder 7 via the rotation-supporting mechanism 21. The rotation-supporting mechanism 21 includes a rotation seat 24 and a bearing mechanism 25. The rotation seat 24 is supported by the fixation member 22 via the bearing mechanism 25 such that the rotation seat 24 is able to rotate. The bearing mechanism 25 includes a first ball bearing 27 and a second ball bearing 28, which are aligned in the Z-axis direction. The first ball bearing 27 is positioned in the +Z direction relative to the second ball bearing 28.

Furthermore, the second unit 4 includes: a rolling magnetic driving mechanism 31 that causes the rotation seat 24 to rotate; and an angular-position-recovering mechanism 32 for causing the rotation seat 24, which has rotated, to recover to a predetermined reference angular position. The rolling magnetic driving mechanism 31 includes: a rolling driving coil 35 held by the rotation seat 24; and a rolling driving magnet 36 held by the fixation member 22. The rolling driving coil 35 and the rolling driving magnet 36 are opposed to each other in the Z-axis direction. The angular-position-recovering mechanism 32 includes an angular-position-recovering magnetic member 37 that is fixed to the rotation seat 24. The angular-position-recovering magnetic member 37 overlaps the rolling driving magnet 36 when seen in the Z-axis direction. Furthermore, the second unit 4 includes a rotation-stopper mechanism 38 that restrains a rotation-angle range of the rotation seat 24. Additionally, the second unit 4 includes: a flexible printed circuit board 39 that is electronically connected to the rolling driving coil 35; and a cover member 40 that is fixed to the fixation member 22.

Here, to the rotation seat 24, there is attached the holder 7 of the first unit 3. Accordingly, when the rotation seat 24 rotates, the movable unit 5 and the holder 7 of the first unit 3 rotates on the Z-axis direction (i.e., on the axis line L) integrally with the rotation seat 24. That is to say, the movable unit 5 and the holder 7 of the first unit 3 and the rotation seat 24 of the second unit 4 configure a movable member 43 that integrally rotates on the Z-axis direction. Contrarily, to the fixation member 22, there is attached the casing member 8 of the first unit 3. Accordingly, the fixation member 22 and the casing member 8 configure a fixed member 44 that supports the movable member 43 such that the movable member 43 is able to rotate. The rotation seat 24 configures the movable member 43 as well as the rotation-supporting mechanism 21.

(First Unit)

Figure 4:
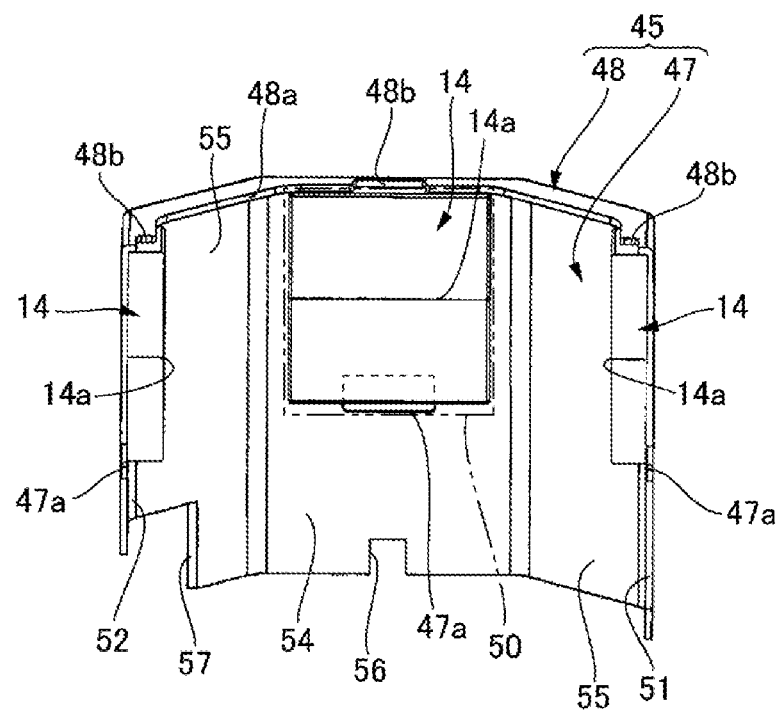
FIG. 4 is a cross-sectional view of a cylindrical casing that configures a fixed member.
Figure 4:
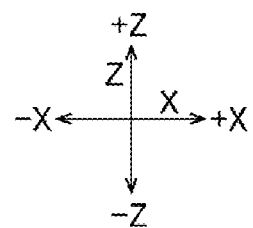

FIG. 4 is a cross-sectional view of the cylindrical casing of the casing member 8 taken along the Z axis. As illustrated in FIG. 3, the casing member 8 includes: a cylindrical casing 45 (i.e., a cylinder member) whose external shape is substantially octagonal when seen in the Z-axis direction; an object-side casing 46 that is attached to the cylindrical casing 45 from the +Z-direction side (i.e., the object side). The cylindrical casing 45 is formed of magnetic material. The object-side casing 46 is formed of resin material.

The cylindrical casing 45 includes: a cylinder part 47 that is in a substantially octagonal shape; and a frame part 48 that is in a shape of a plate extending internally from the +Z-direction-edge part of the cylinder part 47. At the center of the frame part 48, there is formed an opening part 48$a$ that is in a substantially octagonal shape. The cylinder part 47 includes: side-plates 51 and 52 that are opposed to each other in the X-axis direction; side-plates 53 and 54 that are opposed to each other in the Y-axis direction; and side-plates 55 that are provided at four corner-parts, each of which faces diagonally at 45 degrees relative to the X-axis direction and the Y-axis direction. As shown in FIG. 4, holding areas 50 for holding swing driving magnets 14 are respectively provided on the inner circumferential surfaces of the side plates 51 and 52, which are opposed to each other in the X-axis direction, and the side plates 53 and 54, which are opposed to each other in the Y-axis direction. The holding areas 50 are rectangular areas whose length dimension in the Z-axis direction is longer than that of the swing driving magnets 14.

At the holding areas 50, swing driving magnets 14 are held, respectively. Each of the swing driving magnets 14 is magnetized in such a manner that the magnet is polarized in the Z-axis direction. The magnetization-polarized line 14$a$ of each swing driving magnet 14 extends in a direction orthogonal to the Z-axis (i.e., the axis line L) in the circumferential direction. Here, as the cylindrical casing 45 is made of magnetic material, the cylindrical casing 45 holds the swing driving magnets 14 within the holding areas 50 such that the swing driving magnets 14 are able to move in the Z-axis direction. Note that, as detailed in the following description, the swing driving magnets 14 are positionally adjusted in the Z-axis direction using jigs and then fixed inside of the holding areas 50 using an adhesive agent. To fix the swing driving magnets 14, a thermoset adhesive agent may be used.

The cylinder part 47 includes radial-direction-opening parts 47$a$ for allowing jigs to abut the swing driving magnets 14, which are held by the holding areas 50, from the outside of the cylindrical casing 45. The radial-direction-opening parts 47$a$ penetrate through the cylinder part 47 in the radial direction. The radial-direction-opening parts 47$a$ partially overlap the −Z-direction-edge of the holding areas 50 when seen in the radial direction. Furthermore, each of the radial-direction-opening parts 47$a$ is in a rectangular shape that is long in the circumferential direction around the Z axis and is centrally provided with respect to each holding area in the circumferential direction.

The frame part 48 has axis-direction-opening parts 48$b$ for allowing jigs to abut the swing driving magnets 14, which are held by the holding areas 50, from the outside of the cylindrical casing 45. Each of the axis-direction-opening parts 48$b$ is provided in the frame part 48 at a position being opposed to each swing driving magnet 14, which is held by a holding area 50, in the Z-axis direction. Each of the axis-direction-opening parts 48$b$ is in a rectangular shape that is long in the circumferential direction around the Z axis and is centrally provided with respect to each holding area in the circumferential direction.

Furthermore, the cylindrical casing 45 includes position-determining cutout parts 56 respectively at a bottom end-edge portion in the +X direction, a bottom end-edge portion in the +Y direction, and a bottom end-edge portion in the −Y direction. Furthermore, the cylinder part 47 includes, at a bottom end-edge portion in the −X direction, a cutout part 57 in a rectangular shape for drawing out the flexible printed circuit boards 18 and 19.

The object-side casing 46 includes: a body part 58 that is in a cylindrical shape and abuts the frame part 48 of the cylindrical casing 45; and an end-plate part 59 that extends internally from the +Z-direction-edge part of the body part 58. At the center of the end-plate part 59, there is formed a circular opening part 60. To the circular opening part 60, the +Z-direction-end-portion of the optical module 2 is inserted.

(Holder)

Figure 5:
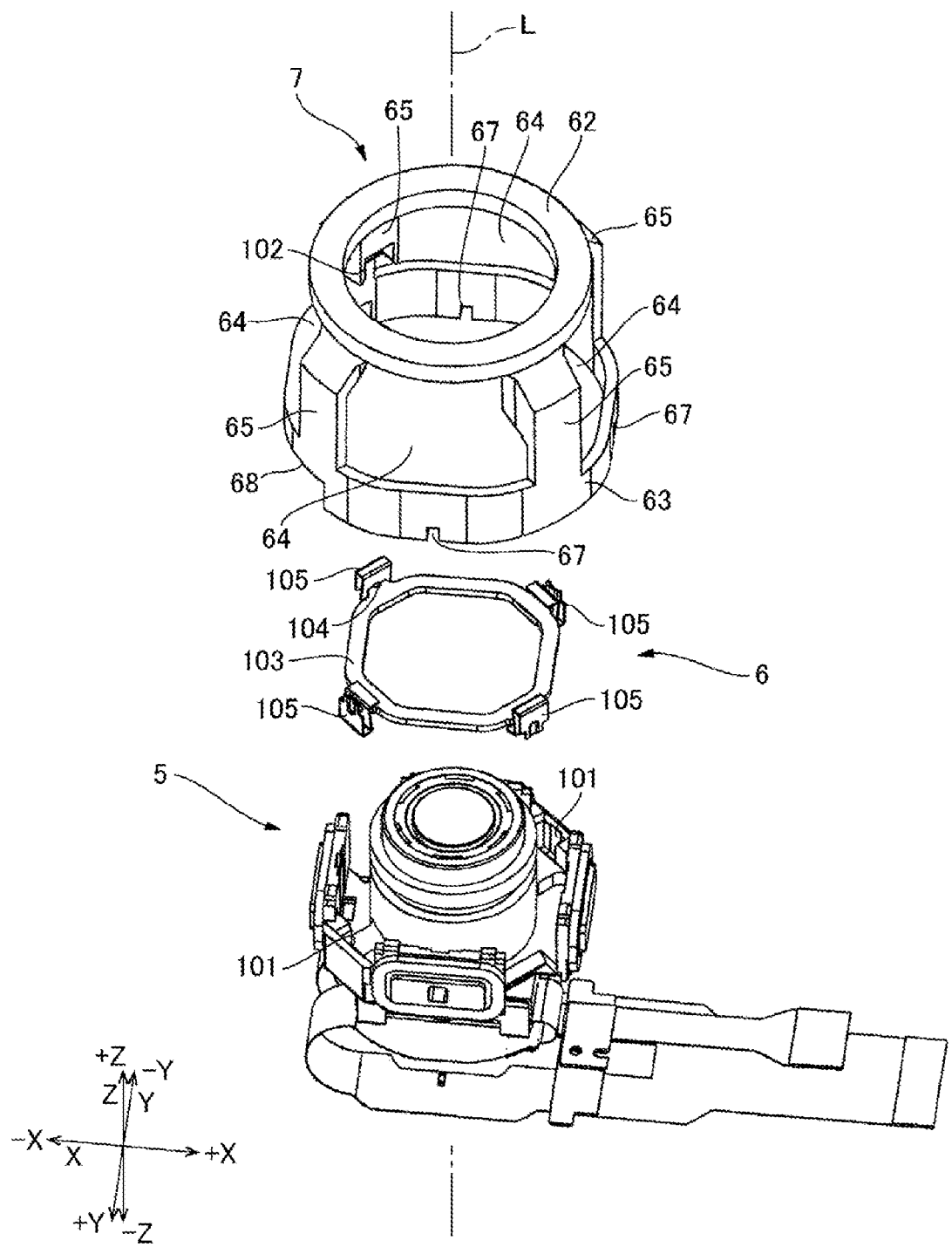
FIG. 5 is an exploded perspective view of a first unit seen from the object side.
Figure 6:
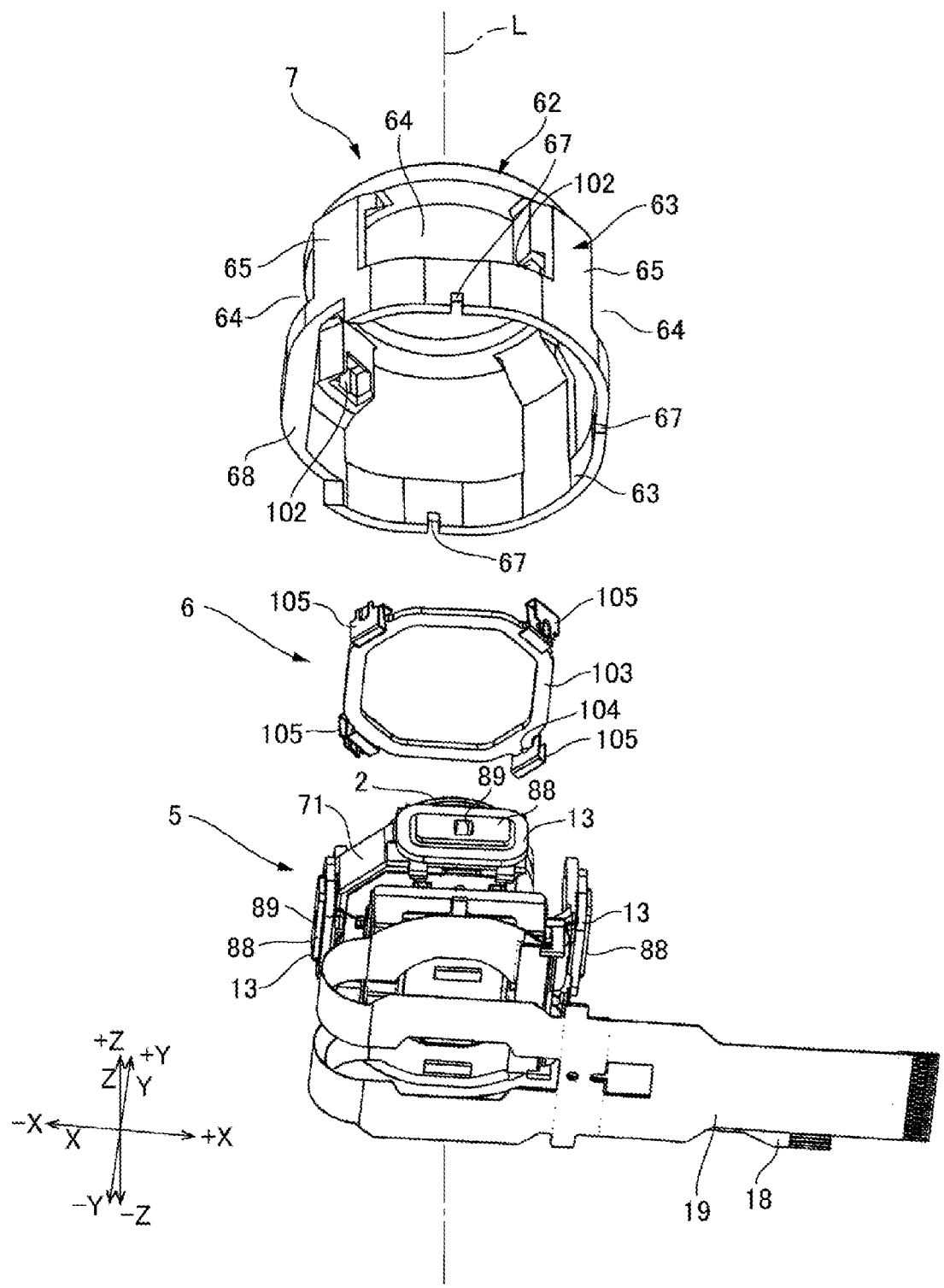
FIG. 6 is an exploded perspective view of the first unit seen from a counter-object side.

FIG. 5 is an exploded perspective view of the movable unit 5 and the holder 7 seen from the +Z-direction side. FIG. 6 is an exploded perspective view of the movable unit 5 and the holder 7 seen from the −Z-direction side. As illustrated in FIG. 5, the holder 7 includes: a holder annular part 62 through which the +Z-direction-end-portion of the movable unit 5 is inserted; and a holder body part 63 that is continuous toward the −Z-direction side of the holder annular part 62. The holder body part 63 includes: four window parts 64 that are aligned in the circumferential direction; and four longitudinal frame parts 65 that partition to create the window parts 64 arranged side by side in the circumferential direction. Two of the four window parts 64 are open in the X-axis direction, and the other two are open in the Y-axis direction. The four longitudinal frame parts 65 are positioned at angles between the X-axis direction and the Y-axis direction, respectively.

The holder body part 63 includes position-determining cutout parts 67 respectively at a bottom end-edge portion in the +X direction, a bottom end-edge portion in the +Y direction, and a bottom end-edge portion in the −Y direction. Furthermore, the holder body part 63 includes, at a bottom end-edge portion in the −X direction, a cutout part 68 that is in a rectangular shape for drawing the flexible printed circuit boards 18 and 19.

(Movable Unit)

Figure 7:
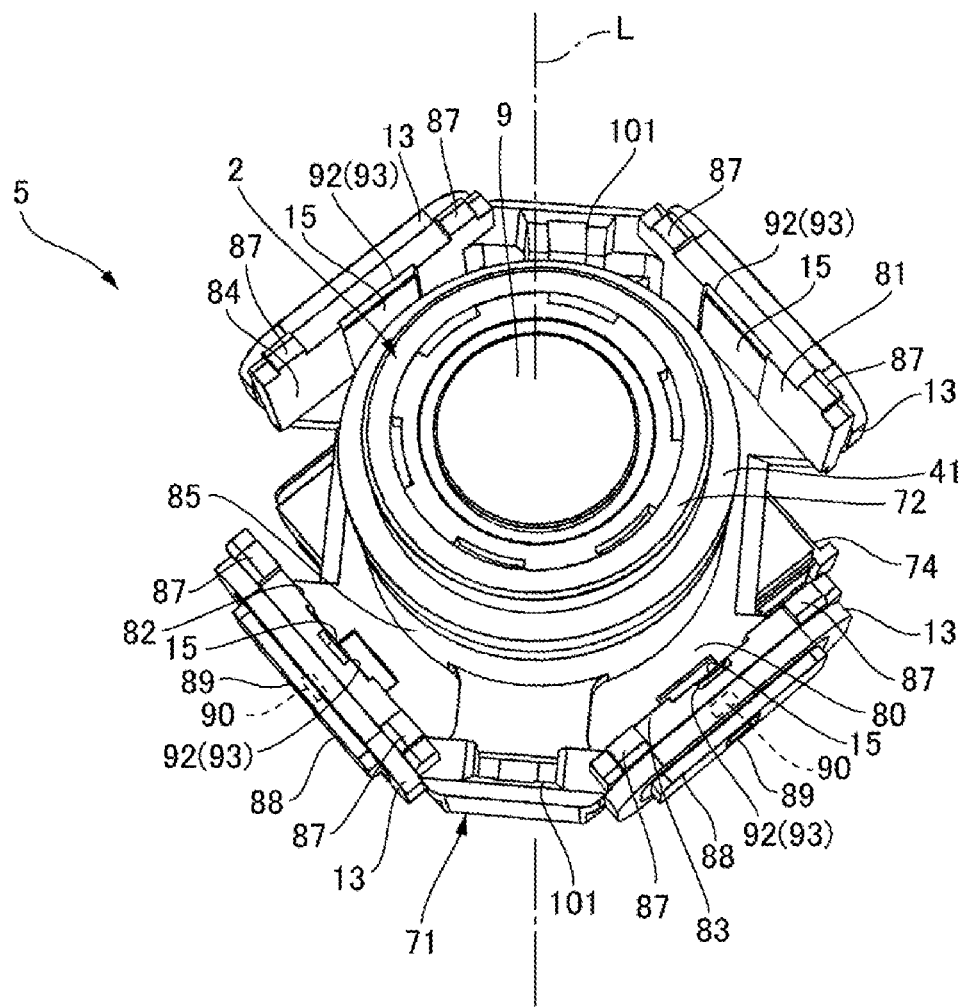
FIG. 7 is a perspective view of a movable member seen from the object side.
Figure 7:
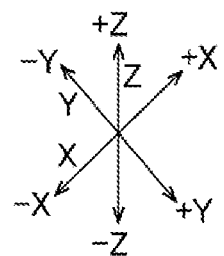
Figure 8A:
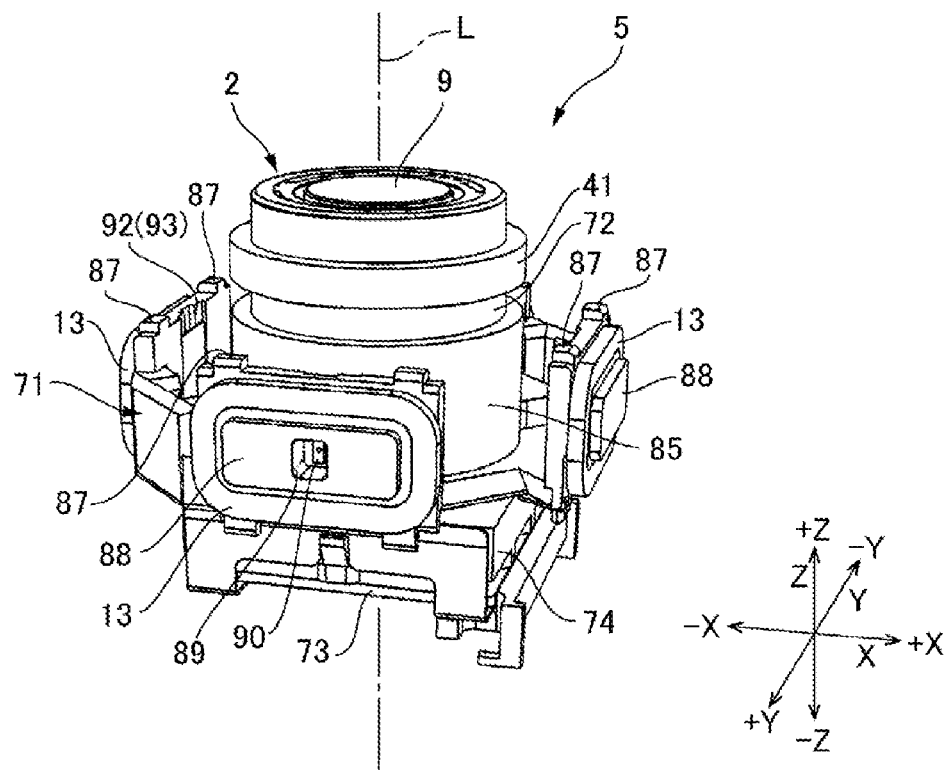
FIG. 8A is a perspective view of the movable member seen from the object side.
Figure 8B:
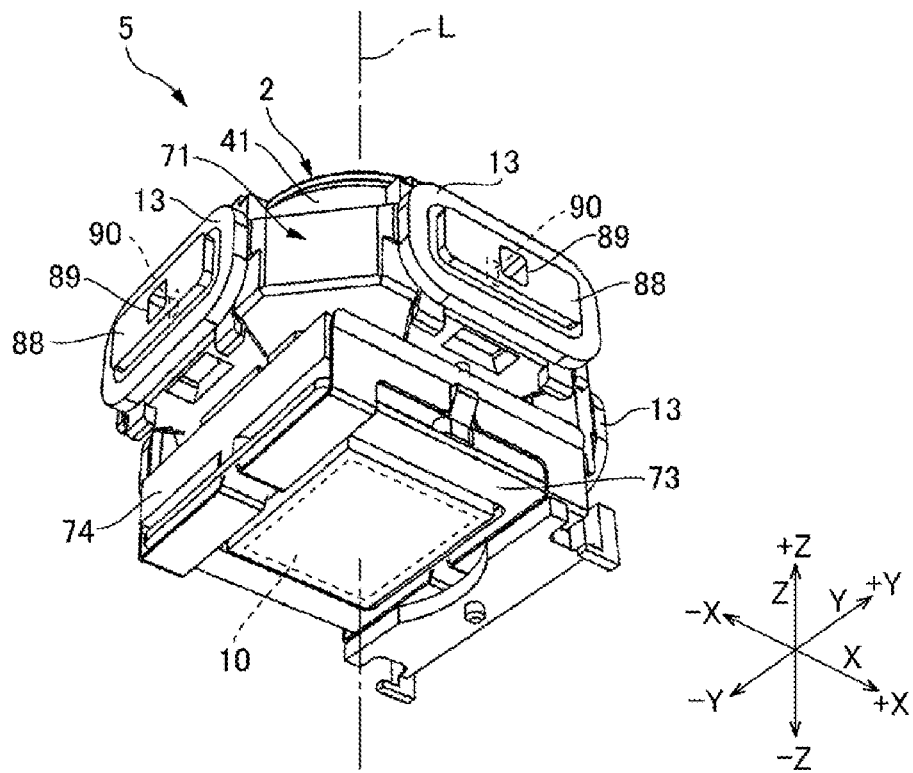
FIG. 8B is a perspective view of the movable member seen from the counter-object side.

FIG. 7 is a perspective view of the movable unit seen from the +Z-direction side (i.e., the object side). FIG. 8A is a perspective view of the movable unit 5 seen from the +Z-direction side (i.e., the object side), and FIG. 8B is a perspective view of the movable unit 5 seen from the −Z-direction side. As illustrated in FIG. 7 and FIGS. 8A and 8B, the movable unit 5 includes: an optical module 2; and an optical module holder 71 that holds the optical module 2 from the outer circumferential side. The optical module 2 includes: a mirror cylinder part 72 that holds an optical element 9 on the inner circumferential side; and a square tube part 74 that holds a circuit board 73 on the inner circumferential side at the −Z-direction-end-portion of the mirror cylinder part 72. On the circuit board 73, an imaging element 10 is mounted.

As illustrated in FIG. 7, the optical module holder 71 includes: a bottom plate part 80 that is in a substantially octagonal shape when seen in the Z-axis direction; a pair of wall parts 81 and 82 that rise in the +Z direction from the both X-axis-direction-ends of the bottom plate part 80 and extend in the Y-axis direction, respectively; and a pair of wall parts 83 and 84 that rise in the +Z direction from the both Y-axis-direction-ends of the bottom plate part 80 and extend in the X-axis direction, respectively. Furthermore, the optical module holder 71 includes an optical-module-holding part 85 that is provided at the center of the bottom plate part 80. The optical-module-holding part 85 is in a cylindrical shape and is coaxial with the axis line L. To the optical-module-holding part 85, the mirror cylinder part 72 of the optical module 2 is inserted.

As illustrated in FIGS. 8A and 8B, the mirror cylinder part 72 is inserted to the optical-module-holding part 85 from the −Z-direction side and penetrates through the optical-module-holding part 85 to protrude in the +Z direction from the optical-module-holding part 85. The optical-module-holding part 85 holds the mirror cylinder part 72 from the outer circumferential side. Here, as illustrated in FIG. 7 and FIGS. 8A and 8B, the weight 41 is attached to the outer circumferential surface of the +Z-direction-end-portion of the mirror cylinder part 72, which protrudes in the +Z direction from the optical-module-holding part 85. The weight 41 is in an annular shape and the mirror cylinder part 72 is inserted to the central hole. The mirror cylinder part 72 penetrates through the weight 41 in the Z-axis direction. The weight is press-fit on the mirror cylinder part 72 or fixed to the mirror cylinder part 72 using an adhesive agent. The weight 41 may be made of, for example, non-magnetic metal material such as brass.

As illustrated in FIG. 7 and FIGS. 8A and 8B, on the +Z-direction-end-surface of each wall part 81, 82, 83, and 84 of the optical module holder 71, there are provided two swing-stopper projection parts 87 that protrude in the +Z direction. The two swing-stopper projection parts 87 respectively protrude from both of the circumferential-direction-end-portions of each wall part 81, 82, 83, and 84.

On the outside-surface of each wall part 81, 82, 83, and 84, which faces outward in the radial direction, there is provided a coil fixation part 88. As illustrated in FIGS. 8A and 8B, to each coil fixation part 88, a swing driving coil 13 is fixed such that the central hole of the swing driving coil 13 faces outward in the radial direction. Furthermore, in the coil fixation part 88 of the wall part 82, which is positioned on the −X-direction side, and the coil fixation part 88 of the wall part 83, which is positioned on the +Y-direction side, there are provided Hall element fixation parts 89, respectively. To each Hall element fixation part 89, a Hall element 90 is fixed. A Hall element 90 is positioned at the center of each swing driving coil 13 with respect to the Z-axis direction. A Hall element 90 is electronically connected to the flexible printed circuit board 18.

As illustrated in FIG. 7, on the inside-surface of each wall part 81, 82, 83, and 84, which faces inward in the radial direction, there is provided a magnetic-member-fixation area 92 to which a position-recovering magnetic member 15 is fixed. A magnetic-member-fixation area 92 is a groove 93 having a predetermined width, which extends in the Z-axis direction on the inside-surface. A position-recovering magnetic member 15 is in a shape of a rectangular plate whose dimension of the Z-axis direction is longer than the dimension of the circumferential direction. Furthermore, the dimension of Z-axis direction of the position-recovering magnetic member 15 is shorter than the dimension of the Z-axis direction of the groove 93. The position-recovering magnetic member 15 is fixed inside the groove 93 using adhesive agent such that the longitudinal direction of the position-recovering magnetic member 15 is oriented in the Z-axis direction. When the movable unit 5 being in the reference position is seen in the radial direction, the center of a position-recovering magnetic member 15 is at a position that overlaps a magnetization-polarized line 14a of a swing driving magnet 14.

(Swing-Supporting Mechanism)

Figure 9:
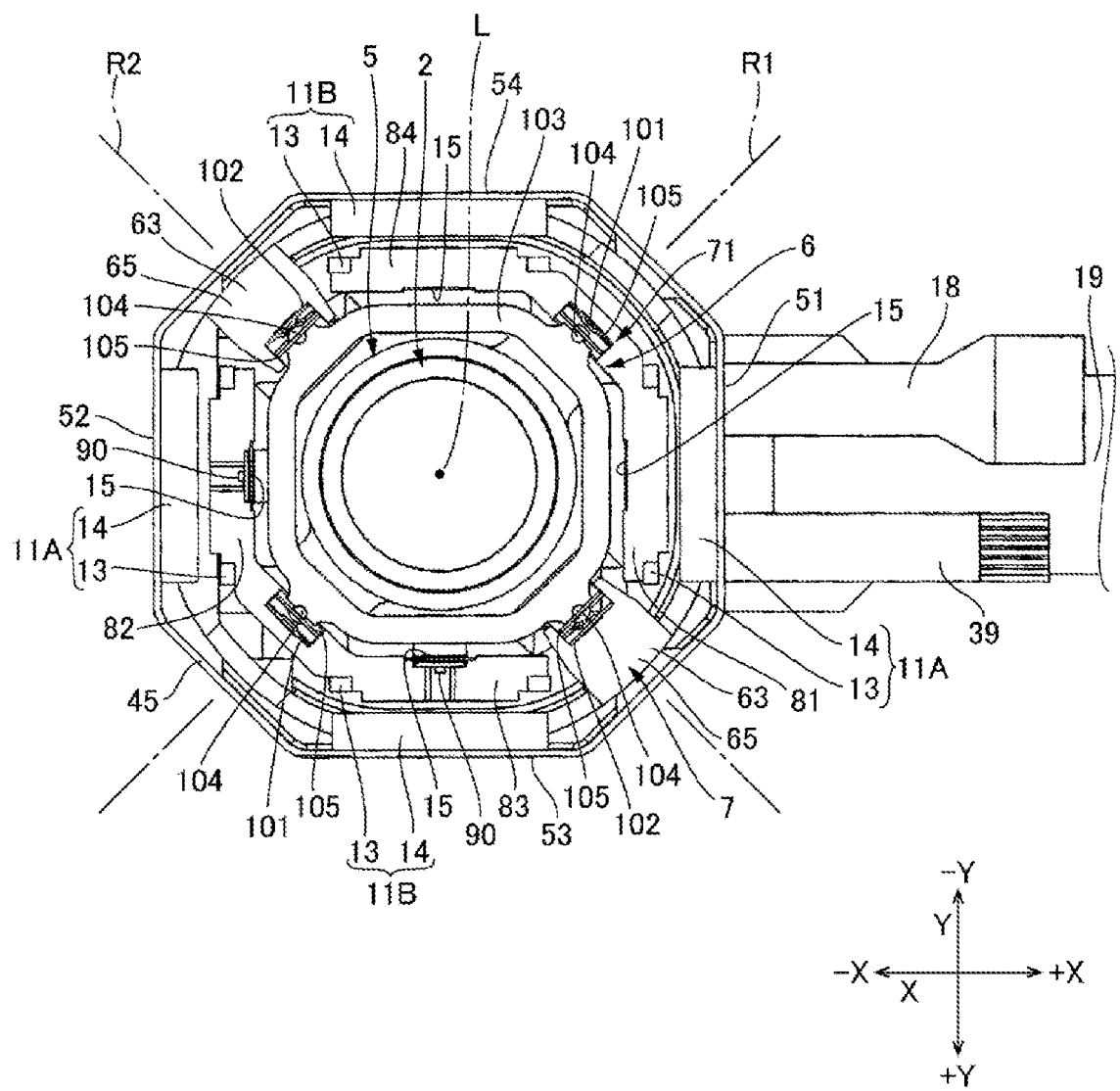
FIG. 9 is a cross-sectional view of the optical unit taken along a plane that is orthogonal to an axis line.

FIG. 9 is a cross-sectional view of the optical unit 1 taken along a plane that is orthogonal to the Z-axis (i.e., the axis line L) and penetrates through the swing-supporting mechanism 6. The swing-supporting mechanism 6 is configured between the optical module holder 71 and the holder 7. As illustrated in FIG. 9, the swing-supporting mechanism 6 includes: two first swing-supporting parts 101 provided on the optical module holder 71 at diagonal positions on a first axis R1 (i.e., a first axis); two second swing-supporting parts 102 provided on the holder body part 63 at diagonal positions on a second axis R2 (i.e., a second axis); and a movable frame 103 supported by the first swing-supporting parts 101 and the second swing-supporting parts 102. Here, the first axis R1 and the second axis R2 are in respective directions that are orthogonal to the Z-axis direction and face diagonally at 45 degrees relative to the X-axis direction and the Y-axis direction. Therefore, the first swing-supporting parts 101 and the second swing-supporting parts 102 are arranged in respective angular positions that are between the X-axis direction and the Y-axis direction. As illustrated in FIG. 5 and FIG. 6, the second swing-supporting parts 102 are depression parts that are formed on the inside-surface of the holder body part 63.

As illustrated in FIG. 9, the movable frame 103 is a plate-shaped spring whose planar shape is substantially octagonal when seen in the Z-axis direction. To the outside-surface of the movable frame 103, metallic balls 104 are fixed by way of welding, etc., at four positions around the Z-axis. The balls 104 respectively make point-contact with contact springs 105 held by the first swing-supporting parts 101, which are provided on the optical module holder 71, and by the second swing-supporting parts 102, which are provided on the holder body part 63. As illustrated in FIG. 5 and FIG. 6, the contact springs 105 are plate-shaped springs. Further, the contact springs 105 held by the first swing-supporting parts 101 are elastically deformable in the first axis R1 direction, and the contact springs 105 held by the second swing-supporting parts 102 are elastically deformable in the second axis R2 direction. Therefore, the movable frame 103 is supported such that the movable frame 103 is able to rotate around the two directions (i.e., the first axis R1 direction and the second axis R2 direction), which are orthogonal to the Z-axis direction.

(Swing Magnetic Driving Mechanism)

As illustrated in FIG. 9, the swing magnetic driving mechanism 11 includes a swing magnetic driving mechanism 11A and a swing magnetic driving mechanism 11B, which are provided between the movable unit 5 and the cylindrical casing 45. The swing magnetic driving mechanism 11A includes two swing magnetic driving mechanisms 11A (i.e., a first swing magnetic driving mechanism and a second swing magnetic driving mechanism), each of which is provided with a pair of a swing driving magnet 14 and a swing driving coil 13 that are opposed to each other in the X-axis direction. The two swing magnetic driving mechanisms 11A are positioned on both sides with the axis line L therebetween. Furthermore, the one of the two swing magnetic driving mechanisms 11A positioned on the −X-direction side includes a Hall element 90 that are arranged on the inside of the swing driving coil 13. The swing magnetic driving mechanism 11B includes two swing magnetic driving mechanisms 11B (i.e., a third swing magnetic driving mechanism and a fourth swing magnetic driving mechanism), each of which is provided with a pair of a swing driving magnet 14 and a swing driving coil 13 that are opposed to each other in the Y-axis direction. The two swing magnetic driving mechanisms 11B are positioned on both sides with the axis line L therebetween. Furthermore, the one of the two swing magnetic driving mechanisms 11B positioned on the +Y-direction side includes a Hall element 90 arranged on the inside of the swing driving coil 13.

The swing driving coils 13 are respectively held on the outside-surfaces of the wall parts 81 and 82, which are on both of the X-axis-direction-sides of the optical module holder 71, and on the outside-surfaces of the wall parts 83 and 84, which are on both of the Y-axis-direction-sides of the optical module holder 71. The swing driving magnets 14 are held on the inside-surfaces of the side-plates 51, 52, 53, and 54, which are provided on the cylindrical casing 45 of the casing member 8. As illustrated in FIG. 2 and FIG. 3, each of the swing driving magnets 14 is separated with respect to the Z-axis direction and is magnetized such that the magnetic poles on the inside-surfaces are different with reference to a magnetization-polarized line 14*a*. As for the swing driving coils 13, the long edge portions on the +Z-direction side and on the −Z-direction side are utilized as effective edges. When the movable unit 5 is in the reference position, each Hall element 90 is opposed to the magnetization-polarized line 14*a* of a swing driving magnet 14, which is positioned on the outer circumferential side. Here, the cylindrical casing 45 is made of magnetic material, and therefore the cylindrical casing 45 functions as a yoke for the swing driving magnets 14.

The two swing magnetic driving mechanisms 11B, which are positioned on the +Y-direction side and on the −Y-direction side of the movable unit 5, are connected by wiring such that magnetic driving force is generated in the same direction around the X-axis when power is supplied to the swing driving coils 13. Furthermore, the two swing magnetic driving mechanisms 11A, which are positioned on the +X-direction side and on the −X-direction side of the movable unit 5, are connected by wiring such that magnetic driving force is generated in the same direction around the Y-axis when power is supplied to the swing driving coils 13. The swing magnetic driving mechanism 11 causes the optical module 2 to rotate on the first axis R1 and on the second axis R2, by way of synthesizing rotation on the X-axis, which is caused by the swing magnetic driving mechanisms 11B, and rotation on the Y-axis, which is caused by the swing magnetic driving mechanisms 11A. In a case of performing shake correction on the X-axis and shake correction on the Y-axis, one rotation on the first axis R1 and two rotations of the second axis R2 are synthesized.

(Swing-Stopper Mechanism)

As illustrated in FIG. 2, the swing-stopper mechanism 17 for restraining the swing range of the movable unit 5 is configured with: the swing-stopper projection parts 87 that are provided on the movable unit 5 (i.e., the optical module holder 71); and the holder annular part 62. In a case where the movable unit 5 is in such a tilting position that exceeds a predetermined swing range of the movable unit 5, the swing-stopper projection parts 87 abut the holder annular part 62 so as to restrain the movable unit 5 from tilting further. Furthermore, as for the swing-stopper mechanism 17, in a case where the movable unit 5 is moved in the +Z direction by external force, the swing-stopper projection parts 87 abut the holder annular part 62 so as to restrain the movable unit 5 from moving further in the +Z direction.

(Position-Recovering Mechanism)

The position-recovering mechanism 12 includes a position-recovering magnetic member 15 and a swing driving magnet 14. As illustrated in FIG. 2, a position-recovering magnetic member 15 is arranged on the opposite side of a swing driving magnet 14 with a swing driving coil 13 therebetween in the radial direction. When the holder 7 being in the reference position is seen in the radial direction, the center of a position-recovering magnetic member 15 is at such a position that overlaps the magnetization-polarized line 14*a* of a swing driving magnet 14, which is positioned on the outer circumferential side. In other words, when the movable unit 5 is in the reference position, a virtual surface 12*a* that includes a magnetization-polarized line 14*a* and is orthogonal to the axis line L would penetrate through the center of a position-recovering magnetic member 15.

Here, when the movable unit 5 tilts from the reference position (i.e., when the optical axis of the optical module 2 tilts relative to the axis line L), the center of a position-recovering magnetic member 15 moves away in the Z-axis direction from the magnetization-polarized line 14*a* of a swing driving magnet 14. Hence, between the position-recovering magnetic member 15 and the swing driving magnet 14, magnetic attractive force is exerted in such a direction that the center of the position-recovering magnetic member 15 is forced toward the side where there is the magnetization-polarized line 14*a* of the swing driving magnet 14. That is to say, when the movable unit 5 tilts from the reference position, magnetic attractive force in such a direction as causing the movable unit 5 to recover to the reference position is exerted between a position-recovering magnetic member 15 and a swing driving magnet 14. Accordingly, a position-recovering magnetic member 15 and a swing driving magnet 14 cause the movable unit 5 to recover to the reference position.

(Second Unit)

Figure 10A:
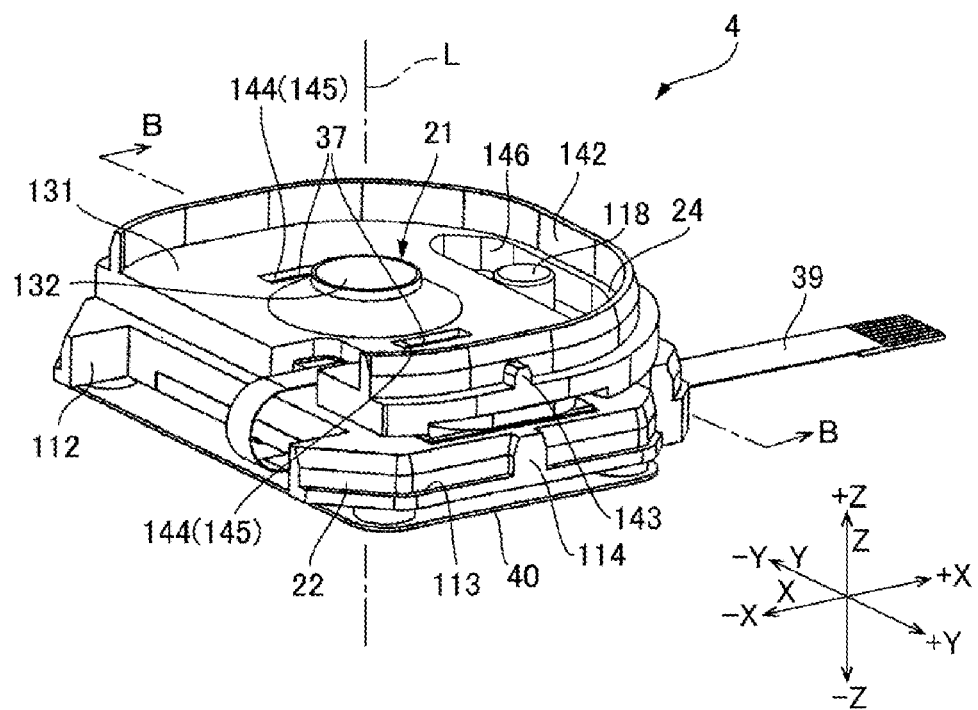
FIG. 10A is a perspective view of a second unit seen from the object side.
Figure 10B:
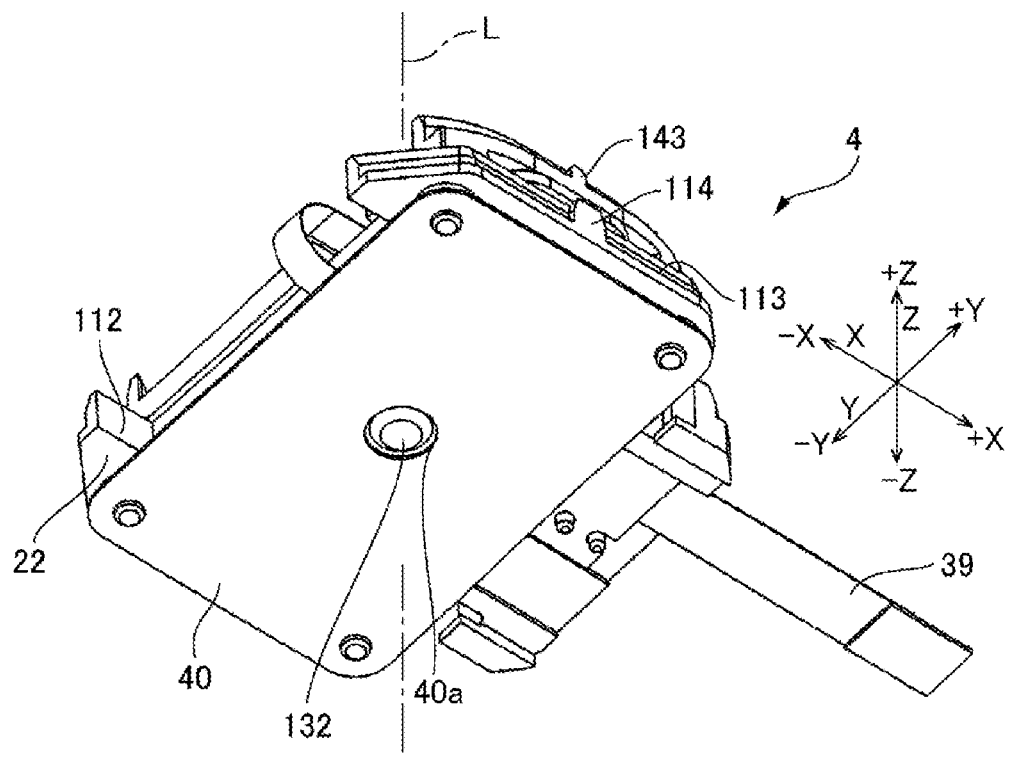
FIG. 10B is a perspective view of the second unit seen from the counter-object side.
Figure 11:
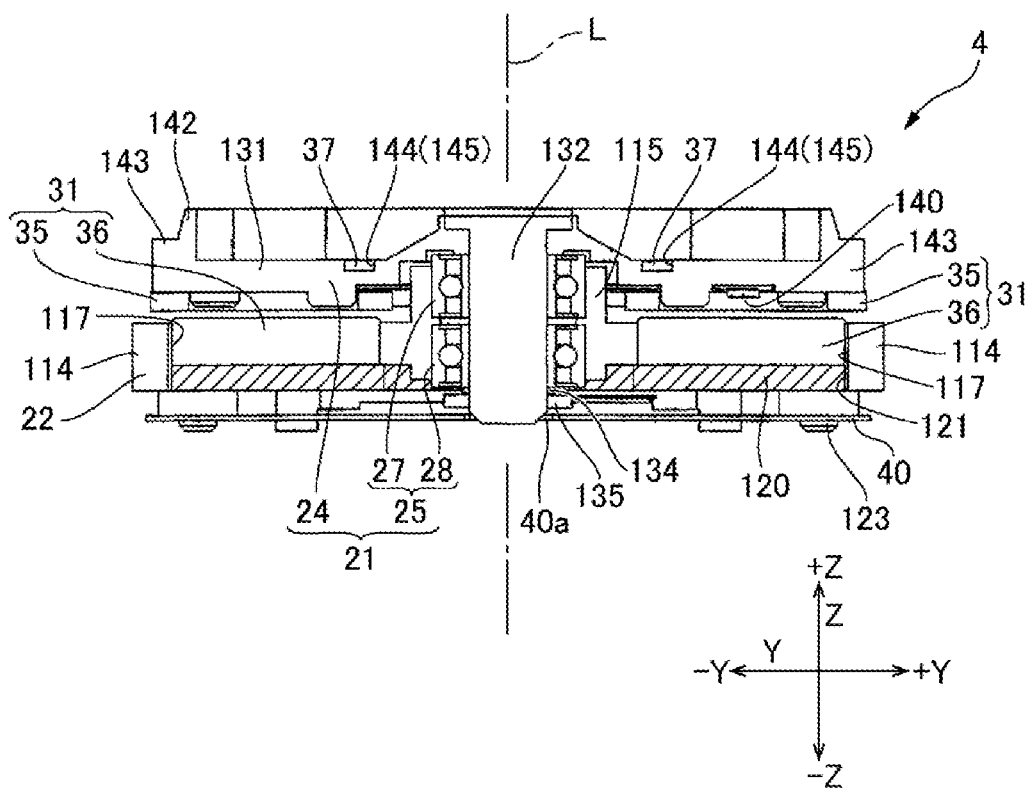
FIG. 11 is a cross-sectional view of the second unit taken along the line B-B of FIG. 10A.
Figure 12:
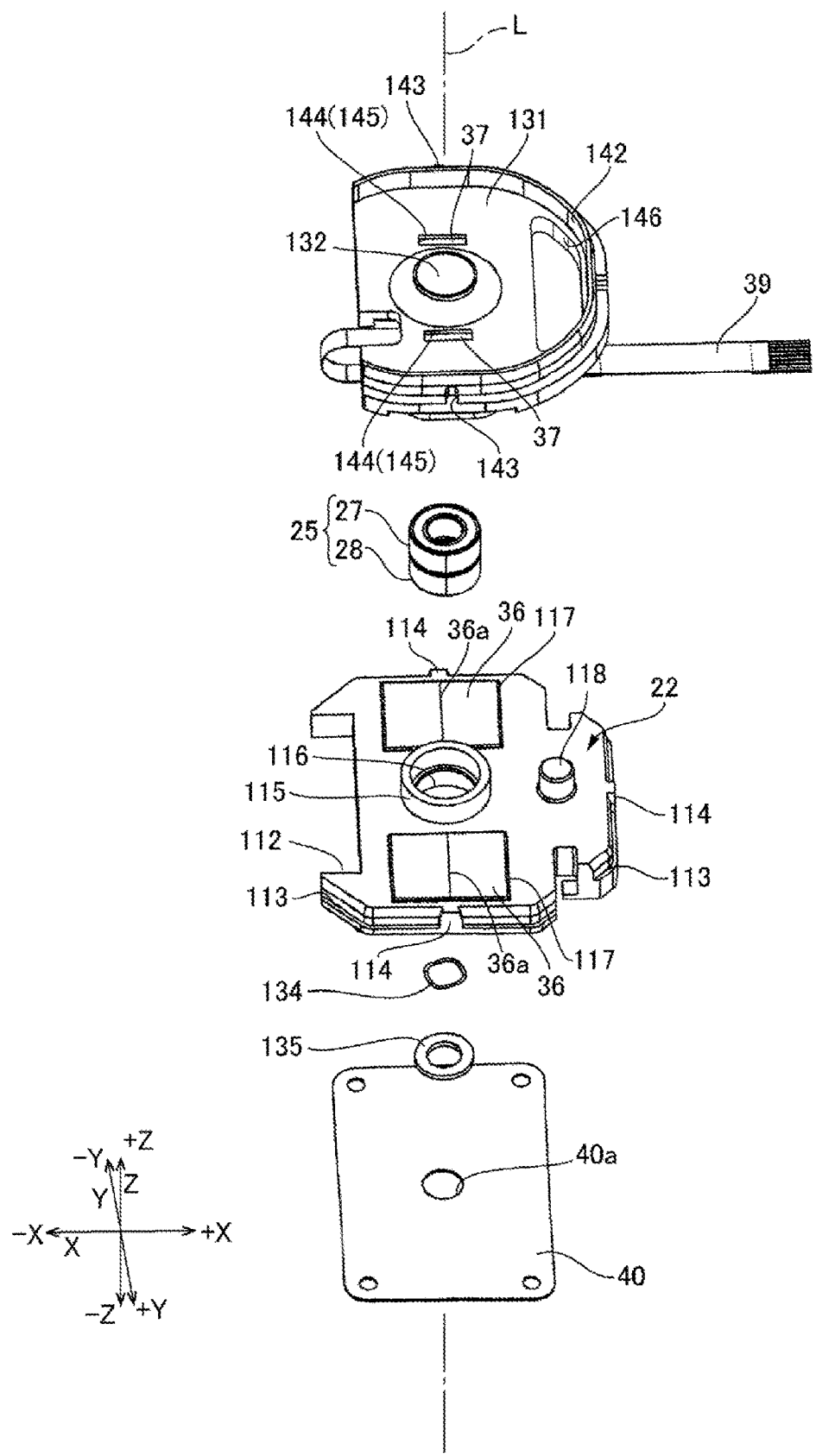
FIG. 12 is an exploded perspective view of the second unit seen from the object side.
Figure 13:
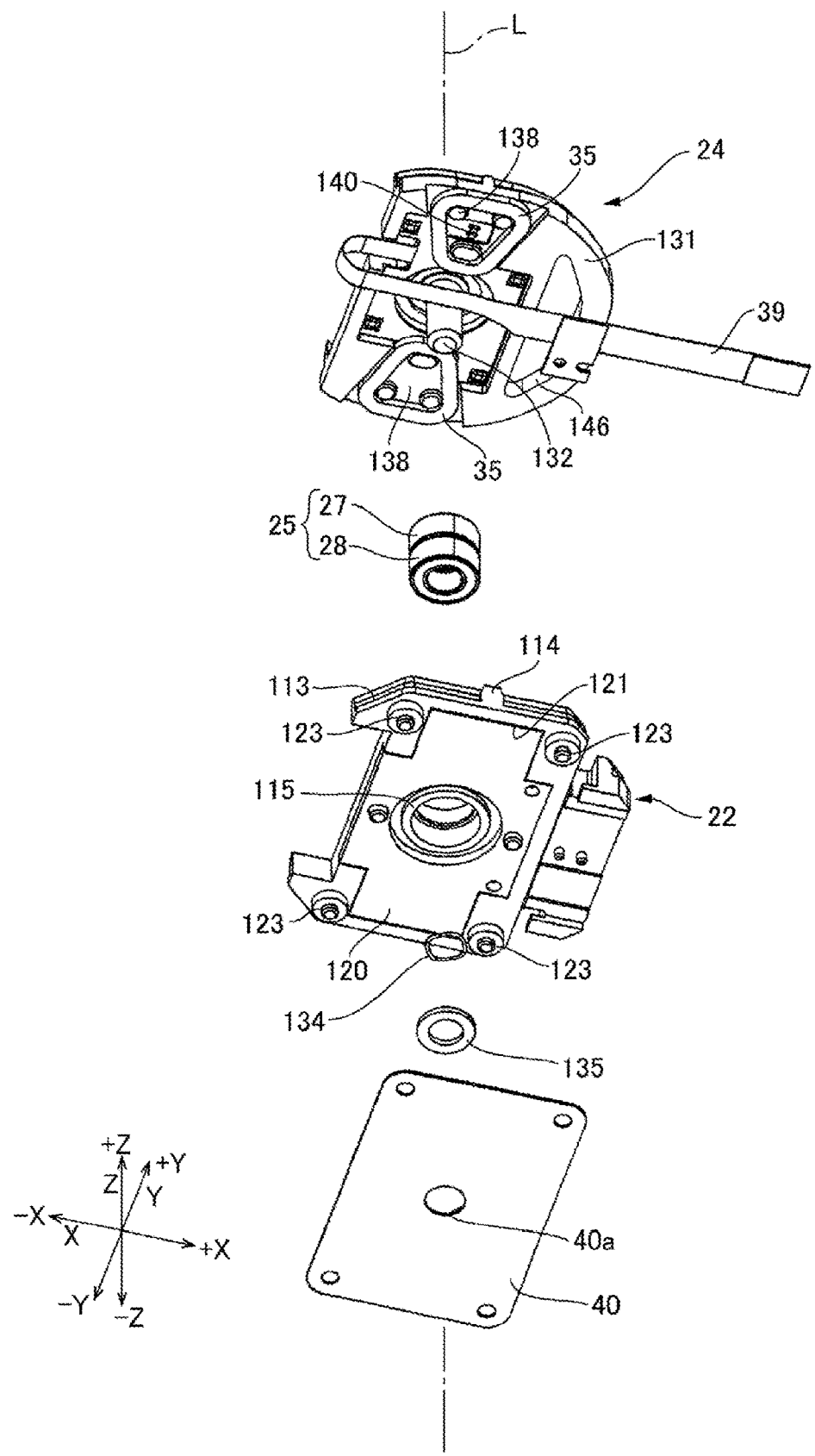
FIG. 13 is an exploded perspective view of the second unit seen from a counter-object side.

FIG. 10A is a perspective view of the second unit 4 seen from the +Z-direction side, and FIG. 10B is a perspective view of the second unit 4 seen from the −Z-direction side. FIG. 11 is a cross-sectional view of the second unit 4. FIG. 12 is an exploded perspective view of the second unit 4 seen from the +Z-direction side (i.e., the object side). FIG. 13 is an exploded perspective view of the second unit 4 seen from the −Z-direction side (i.e., the counter-object side). As illustrated in FIGS. 10A and 10B and FIG. 11, the second unit 4 includes: a rotation-supporting mechanism 21 that supports the holder 7 such that the holder 7 is able to rotate on the axis line L; a fixation member 22 that supports the holder 7 via the rotation-supporting mechanism 21; a flexible printed circuit board 39; and a cover member 40. The rotation-supporting mechanism 21 includes: a rotation seat 24; and a bearing mechanism 25 (i.e., a first ball bearing 27 and a second ball bearing 28).

As illustrated in FIG. 12, the fixation member 22 is in a flat shape that is thin in the Z-axis direction. The fixation member 22 includes a rectangular cutout part 112 at the bottom end-edge portion in the −X direction. The fixation member 22 includes a stepped part 113 at the outer-circumferential-edge-portion, except at the cutout part 112. On the stepped part 113, there are provided three protrusion parts 114 that protrude in the +X direction, the +Y direction, and the −Y direction, respectively.

As illustrated in FIG. 12 and FIG. 13, the fixation member 22 includes, at the center with respect to the Y-axis direction, a cylinder part 115 that protrudes in the +Z direction and in the −Z direction. The central hole 116 of the cylinder part 115 penetrates through the fixation member 22 in the Z-axis direction. As illustrated in FIG. 11, on the inner circumferential side of the cylinder part 115, the first ball bearing 27 and the second ball bearing 28 are held. In other words, the cylinder part 115 holds the outer ring of the first ball bearing 27 and the outer ring of the second ball bearing 28 from the outer circumferential side.

Furthermore, as illustrated in FIG. 12, the fixation member 22 includes a pair of rolling-driving-magnet-holding depression parts 117 on the +Z-direction-end-surface. The pair of rolling-driving-magnet-holding depression parts 117 are provided on both side such that the cylinder part 115 is therebetween. To each of the rolling-driving-magnet-holding depression parts 117, a rolling driving magnet 36 is inserted and fixed. Each of the rolling driving magnets 36 is protected by the fixation member 22 from the outer circumferential side. Here, the rolling driving magnet 36 is magnetized in such a manner that the magnet is polarized in the circumferential direction. The magnetization-polarized line 36a of each rolling driving magnet 36 is at the center of the rolling driving magnet 36 with respect to the circumferential direction and extends in the radial direction. Furthermore, the fixation member 22 includes, at a position apart from the cylinder part 115 in the +X direction, a rotation-stopper projection part 118 that protrudes in the +Z direction.

Furthermore, as illustrated in FIG. 13, the fixation member 22 includes a yoke-holding depression part 121 on the −Z-direction-end-surface. The yoke-holding depression part 121 is provided such that the yoke-holding depression part 121 encloses the cylinder part 115. The yoke-holding depression part 121 extends in the Y-axis direction. When seen in the Z-axis direction, the yoke-holding depression part 121 and the pair of rolling-driving-magnet-holding depression parts 117 overlap and the yoke-holding depression part 121 and the pair of rolling-driving-magnet-holding depression parts 117 communicate with each other in the Z-axis direction. To the yoke-holding depression part 121, the yoke 120 is inserted from the −Z direction. The yoke 120 is formed of magnetic material. Here, as the yoke-holding depression part 121 and the pair of rolling-driving-magnet-holding depression parts 117 communicate with each other, the yoke 120 abuts the rolling driving magnets 36, which are held by the rolling-driving-magnet-holding depression parts 117, from the −Z direction.

Furthermore, as illustrated in FIG. 13, the fixation member 22 includes, on the outer circumferential side of the yoke-holding depression part 121, four cover-member-fixation projection parts 123 that protrude in the −Z direction. Two of the four cover-member-fixation projection parts 123 are provided on both sides of the +Y-direction-end-edge-portion of the fixation member 22 with the yoke-holding depression part 121 therebetween in the X-axis direction. The other two of the four cover-member-fixation projection parts 123 are provided on both sides of the −Y-direction-end-edge-portion of the fixation member 22 such that the yoke-holding depression part 121 is therebetween in the X-axis direction. To the four cover-member-fixation projection parts 123, the cover member 40 is fixed from the −Z direction. The cover member 40 covers the yoke 120 from the −Z direction. At the center of the cover member 40, there is provided an opening part 40a that is in a circular shape. As illustrated in FIG. 10B, when the cover member 40 is fixed to the fixation member 22, the tip of a shaft part 132 is inserted to the opening part 40a.

Next, as illustrated in FIG. 13, the rotation seat 24 includes: a flat seat main body 131 that is thin in the Z-axis direction; and the shaft part 132 that protrudes in the −Z direction from the seat main body 131. As illustrated in FIG. 11, the shaft part 132 is inserted to the first ball bearing 27 and the second ball bearing 28 that are held by the cylinder part 115 of the fixation member 22. That is to say, the shaft part 132 is held by the inner rings of the first ball bearing 27 and the second ball bearing 28 from the outer circumferential side. The shaft part 132 penetrates through the first ball bearing 27 and the second ball bearing 28, and the tip portion of the shaft part 132 protrudes in the −Z direction from the second ball bearing 28. To the tip portion of the shaft part 132, a spring washer 134 is inserted. Furthermore, to the tip portion of the shaft part 132, an annular member 135 is fixed by means of welding, etc. Here, the spring washer 134 is compressed between the inner ring of the second ball bearing 28 and the annular member 135, and therefore imposes a pressure on the first ball bearing 27 and the second ball bearing 28.

As illustrated in FIG. 13, regarding the seat main body 131, on both sides of the surface that is opposed to the fixation member 22, there is provided a pair of coil fixation parts 138 with the shaft part 132 therebetween. On the pair of coil fixation parts 138, the rolling driving coils 35 are held in such a position that the central holes of the rolling driving coils 35 face in the Z-axis direction. To the inside of the rolling driving coil 35 fixed to one of the coil fixation parts 138, there is fixed a Hall element 140. The Hall element 140 is positioned at the center of the rolling driving coil 35 with respect to the circumferential direction. The Hall element 140 is electronically connected to the flexible printed circuit board 39, which is electronically connected to the rolling driving coil 35.

As illustrated in FIG. 12, regarding the end-surface on the +Z-direction side of the seat main body 131, on the outer-circumferential-end-portion that is offset to the inside from the outer-circumferential-end by a predetermined width, there is provided a peripheral wall 142 formed in a substantially U-shape that encloses the end-surface from the +X direction and from both sides in the Y-axis direction. On the peripheral wall 142, there are provided three protrusion parts 143 that protrude in the +X direction, the +Y direction, and the −Y direction, respectively.

Furthermore, regarding the end-surface on the +Z-direction side of the seat main body 131, there are provided magnetic-member-fixation areas 144, to which the angular-position-recovering magnetic members 37 are fixed, on both sides with the cylinder part 115 therebetween in the Y-axis direction. The magnetic-member-fixation areas 144 are grooves 145 having predetermined widths that are parallelly extend in the X-axis direction. An angular-position-recovering magnetic member 37 is in a shape of a square pole whose dimension of the circumferential direction (i.e., the X-axis direction) is longer than the dimension of the radial direction. Furthermore, the dimension of the circumferential direction (i.e., the X-axis direction) of an angular-position-recovering magnetic member 37 is shorter than the dimension of the circumferential direction (i.e., the X-axis direction) of a groove 145.

An angular-position-recovering magnetic member 37 is fixed inside a groove 145 (i.e., inside a magnetic-member-fixation area 144) in such a position that the longitudinal direction is oriented in the circumferential direction. The position to fix an angular-position-recovering magnetic member 37 is adjusted inside a groove 145, and then the angular-position-recovering magnetic member 37 is fixed inside the groove 145 using an adhesive agent, such that, when the rotation seat 24 being at a predetermined reference angular position is seen in the Z-axis direction, the center of the angular-position-recovering magnetic member 37 is at such a position that overlaps the magnetization-polarized line 36a of a rolling driving magnet 36.

Here, the seat main body 131 includes an opening part 146 at a different position from the magnetic-member-fixation areas 144 with respect to the circumferential direction. In the present embodiment, the opening part 146 is provided at a position apart from the shaft part 132 in the +X direction.

(Rolling Magnetic Driving Mechanism)

As illustrated in FIGS. 10A and 10B and FIG. 11, when the rotation seat 24 is held by the fixation member 22 via the first ball bearing 27 and the second ball bearing 28, a rolling magnetic driving mechanism 31 is configured. As illustrated in FIG. 11, the rolling magnetic driving mechanism 31 includes a pair of rolling magnetic driving mechanisms 31 held on both sides of the rotation seat 24 with the shaft part 132 therebetween. Each rolling magnetic driving mechanism 31 includes: a rolling driving coil 35 that is held by the rotation seat 24; and a rolling driving magnet 36 that is held by the fixation member 22 and is opposed to a corresponding rolling driving coil 35 in the Z-axis direction. The rolling driving magnet 36 is separated into two with respect to the circumferential direction and magnetized such that the magnetic poles on the surface that is opposed to the rolling driving coil 35 are different with reference to the magnetization-polarized line 36a. The rolling driving coils 35 are coreless coils, and the long edge portions extending in the radial direction are utilized as effective edges. When the rotation seat 24 is at a predetermined reference angular position, the Hall element 140 is opposed to the magnetization-polarized line 36a of the swing driving magnet 14 positioned in the −Z direction.

(Rotation-Stopper Mechanism)

Furthermore, as illustrated in FIG. 10A, when the rotation seat 24 is held by the fixation member 22 via the first ball bearing 27 and the second ball bearing 28, the rotation-stopper projection part 118 of the fixation member 22 is inserted to the opening part 146 of the rotation seat 24. Hence, the rotation-stopper projection part 118 of the fixation member 22 and the opening part 146 of the rotation seat 24 configure the rotation-stopper mechanism 38 that restrains the rotation-angle range of the rotation seat 24 that rotates on the Z-axis. That is to say, the rotation seat 24 rotates on the Z-axis in such a range that the rotation-stopper projection part 118 does not interfere with the inner wall (i.e., abutting part) of the opening part 146. In other words, the rotation-stopper mechanism 38 restrains the rotation-angle range of the rotation seat 24 in such a way that the inner wall of the opening part 146 abuts the rotation-stopper projection part 118 from the circumferential direction.

(Angular-Position-Recovering Mechanism)

Figure 14:
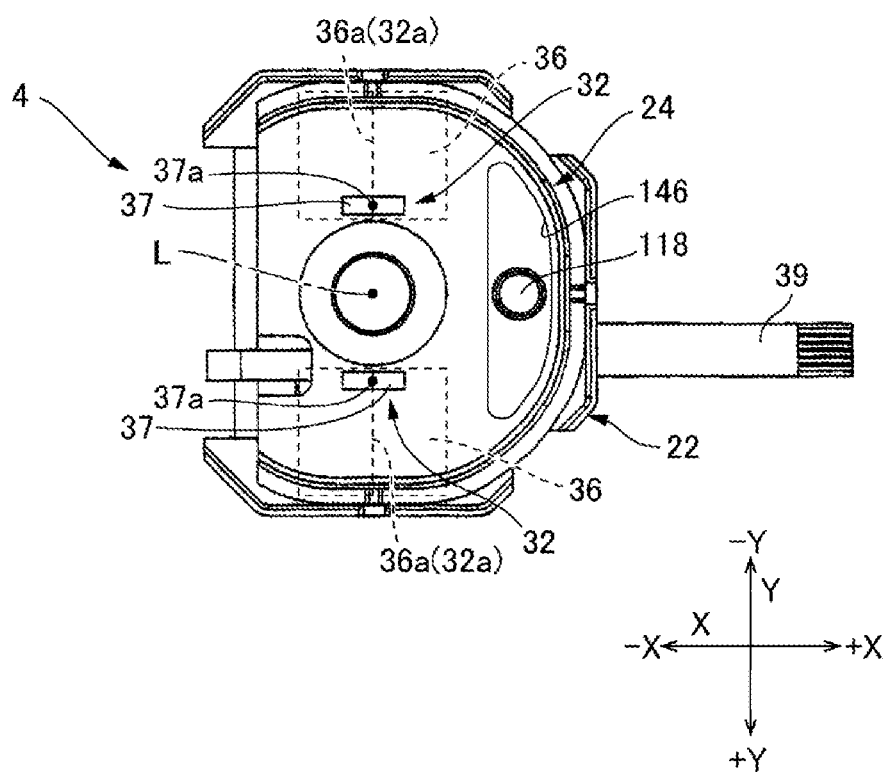
FIG. 14 is an explanatory diagram of an angular-position-recovering mechanism.

FIG. 14 is an explanatory diagram of the angular-position-recovering mechanism 32. As illustrated in FIG. 14, the angular-position-recovering mechanism 32 includes angular-position-recovering magnetic members 37 and rolling driving magnets 36. As illustrated in FIG. 11, the angular-position-recovering magnetic members 37 are arranged on the other side of the rolling driving magnets 36 with the rolling driving coils 35 therebetween in the Z-axis direction. Furthermore, as illustrated in FIG. 14, when the rotation seat 24 being at a reference angular position while being supported by the fixation member 22 via the bearing mechanism 25 such that the rotation seat 24 is able to rotate is seen from the Z-axis direction, the center 37a of an angular-position-recovering magnetic member 37 is at such a position that overlaps the magnetization-polarized line 36a of a rolling driving magnet 36, which is positioned in the −Z direction.

In other words, in a state where the rotation seat 24 is at the reference angular position, a virtual surface 32a that includes a magnetization-polarized line 36a and extends parallelly to the axis line L would penetrate through the center 37a of an angular-position-recovering magnetic member 37.

Next, when the rotation seat 24 rotates in the CW direction or in the CCW direction relative to the reference position of rotation, the center 37a of an angular-position-recovering magnetic member 37 moves away from the magnetization-polarized line 36a of a rolling driving magnet 36 in the circumferential direction. Hence, between the angular-position-recovering magnetic member 37 and the rolling driving magnet 36, magnetic attractive force is exerted in such a direction that the center 37a of the angular-position-recovering magnetic member 37 is forced toward the side where there is the magnetization-polarized line 36a of the rolling driving magnet 36. That is to say, when the rotation seat 24 rotates relative to the reference angular position, magnetic attractive force in such a direction that the rotation seat 24 is forced to recover to the reference angular position is exerted between an angular-position-recovering magnetic member 37 and a rolling driving magnet 36. Accordingly, an angular-position-recovering magnetic member 37 and a rolling driving magnet 36 function as an angular-position-recovering mechanism 32 that causes the rotation seat 24 to recover to the reference angular position.

(Attachment of the First Unit to the Second Unit)

Here, when the first unit 3 is attached to the second unit 4, the peripheral wall 142 of the second unit 4 is inserted to the bottom end-portion of the holder body part 63 of the holder 7. Further, the protrusion parts 143, which protrude from the peripheral wall 142 of the second unit 4, are inserted to the position-determining cutout parts 67, which are provided in the holder body part 63. Accordingly, the holder 7 is fixed to the rotation seat 24 while the position of the holder 7 with respect to the radial direction and the circumferential direction is determined. Furthermore, when the first unit 3 is attached to the second unit 4, the portion on the +Z-direction side of the stepped part 113, which is provided on the outer circumferential edge of the fixation member 22, is inserted to the bottom end-portion of the cylindrical casing 45. Further, the protrusion parts 114, which are provided on the stepped part 113, are inserted to the position-determining cutout parts 56, which are provided in the cylindrical casing 45. Accordingly, the casing member 8 is fixed to the fixation member 22 while the position of the casing member 8 with respect to the radial direction and the circumferential direction is determined, so as to configure the fixed member 44. In the above way, the optical unit 1 is assembled.

(Shake Correction of the Optical Unit)

As described above, regarding the optical unit 1, the first unit 3 includes the swing magnetic driving mechanism 11 that is configured to perform shake correction on the X-axis and shake correction on the Y-axis direction. Therefore, shake correction in the pitching (i.e., vertical swing) direction and the yawing (i.e., transverse swing) direction is possible. Furthermore, regarding the optical unit 1, the second unit 4 includes the rolling magnetic driving mechanism 31 that is configured to cause the holder 7 of the first unit 3 to rotate, and therefore it is possible to perform shake correction in the rolling direction. Here, the optical unit 1 includes a gyroscope in the movable unit 5, and therefore the optical unit 1 detects shake on three axes that are orthogonal to each other by use of the gyroscope, so as to drive the swing magnetic driving mechanism 11 and the rolling magnetic driving mechanism 31 such that the detected shake is offset.

Note that it is possible to perform shake correction of the optical unit 1, based on an output from a Hall element 90 and an output from a Hall element 140.

That is to say, as a Hall element 90 is opposed to the magnetization-polarized line 14a of a swing driving magnet 14 when the movable unit 5 is at the reference position, it is possible to detect that the movable unit 5 is in the reference position as well as an angle of the movable unit 5 tilting relative to the axis line L, based on an output from the Hall element 90. Therefore, when the swing magnetic driving mechanism 11 is driven to offset the tilt of the movable unit 5 such that the movable unit 5 recovers to the reference position, based on an output from the Hall element 90, it is possible to correct shake of the optical unit 1 on the X axis and on the Y axis. Furthermore, when the rotation seat 24 (i.e., the movable member 43) is at the reference angular position, the Hall element 140 is opposed to the magnetization-polarized line 36a of a rolling driving magnet 36 in the Z-axis direction. Therefore, it is possible to detect that the rotation seat 24 (i.e., the movable member 43) is at the reference angular position as well as a rotation angle of the rotation seat 24 (i.e., the movable member 43) rotating relative to the reference angular position, based on an output from the Hall element 140. Therefore, when the rolling magnetic driving mechanism 31 is driven to offset the rotation of the rotation seat 24 (i.e., the movable member 43) such that the rotation seat 24 (i.e., the movable member 43) recovers to the reference angular position, based on an output from the Hall element 140, it is possible to correct shake of the optical unit 1 on the Z axis.

Furthermore, shake correction of the optical unit 1 may be performed, based on shake on three axes detected by a gyroscope, an output from a Hall element 90, and an output from a Hall element 140. In this case, shake on the three axes is detected by the gyroscope, and then the swing magnetic driving mechanism 11 and the rolling magnetic driving mechanism 31 are driven so as to offset the detected shake. Further, when causing the movable unit 5 to recover to the reference position, the swing magnetic driving mechanism 11 is driven, based on an output from the Hall element 90, such that the movable unit 5 accurately recovers to the reference position. Furthermore, when causing the rotation seat 24 (i.e., the movable member 43) to recover to the reference angular position, the rolling magnetic driving mechanism 31 is driven, based on an output from the Hall element 140, such that the rotation seat 24 (i.e., the movable member 43) accurately recovers to the reference angular position.

(Method for Adjusting a Position of the Movable Unit)

Figure 15:
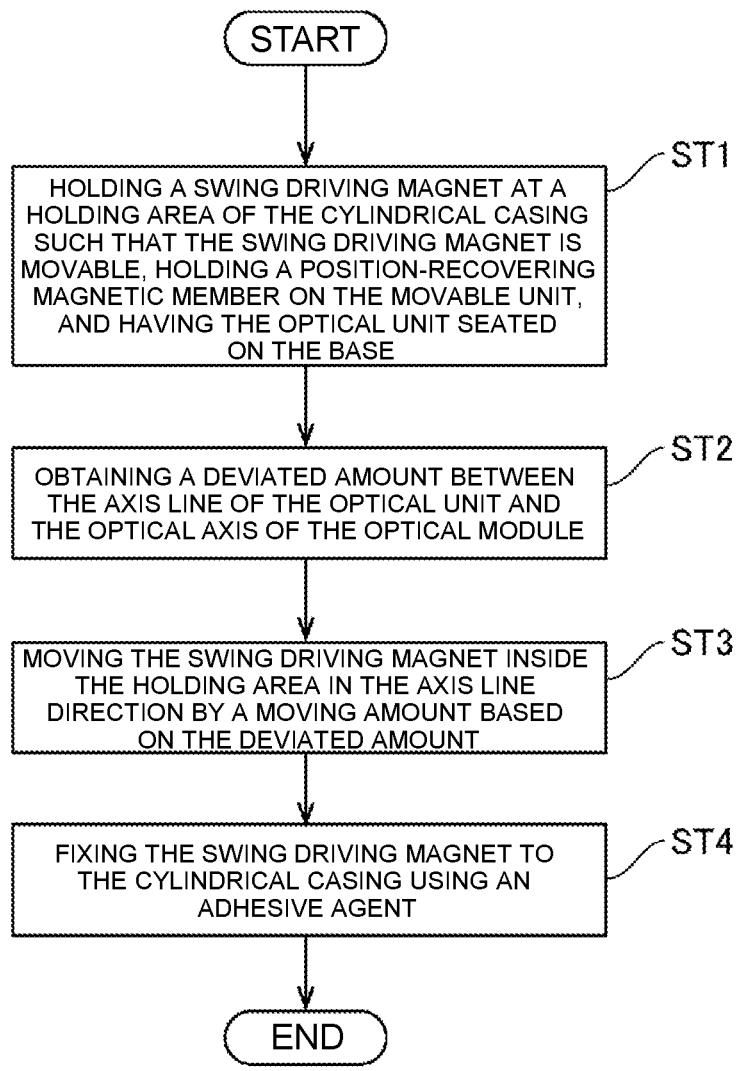
FIG. 15 is a flowchart of an operation of adjusting a position of the movable unit.
Figure 16:
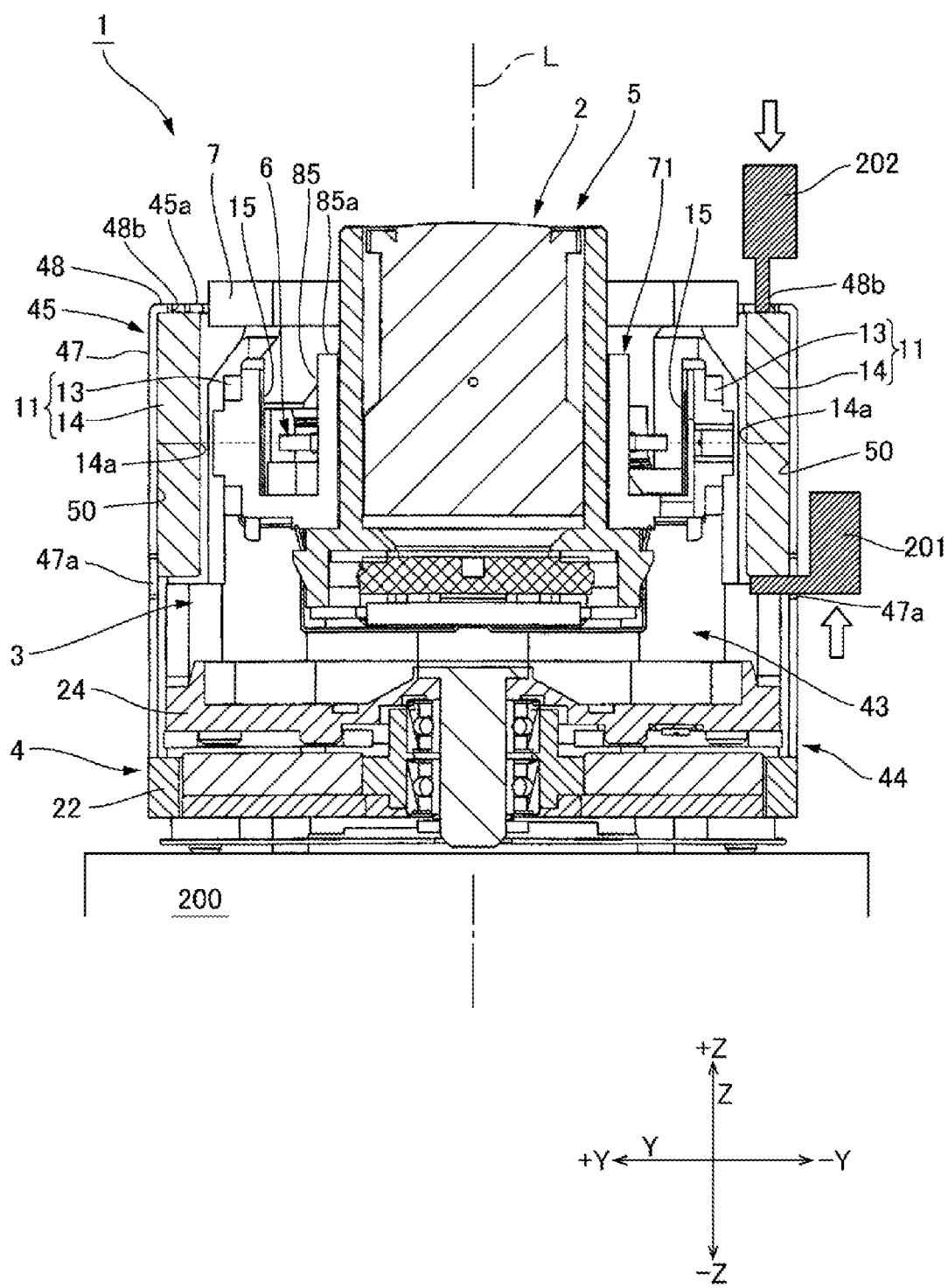
FIG. 16 is an explanatory diagram of the operation of adjusting a position of the movable unit.

FIG. 15 is a flowchart of a method for adjusting a position of the movable unit 5. FIG. 16 is an explanatory diagram of the method for adjusting a position of the movable unit 5. Position adjustment (i.e., adjustment of a position of a swing member) of the movable unit 5 for causing the optical axis of the optical module 2 and the predetermined axis line L to correspond to each other is performed at the final phase of assembling the optical unit 1. More specifically, the position adjustment is performed when: the first unit 3 is attached to the second unit 4; the object-side casing 46 is not attached to the cylindrical casing 45; and the weight 41 is not attached to the movable unit 5. Note that the weight 41 may be attached to the movable unit 5.

Here, regarding the first unit 3, the movable unit 5 (i.e., the swing member) is supported by the holder 7 (i.e., the supporting member) via the swing-supporting mechanism 6. The holder 7 is attached to the rotation seat 24. The cylindrical casing 45 is attached to the fixation part 22. Furthermore, here, a position-recovering magnetic member 15 is attached to the optical module holder 71 of the movable unit 5. A swing driving magnet 14 is held by way of magnetic attraction at a holding area 50 on the cylinder part 47 of the cylindrical casing 45. In addition, at the holding area 50, an adhesive agent in an uncured state is applied. At first, the swing driving magnet 14 is held at a central portion of the holding area 50 with respect to the Z-axis direction. Therefore, it is possible to move the swing driving magnet 14 inside the holding area 50 in both of the +Z-direction and the −Z-direction.

When performing position adjustment of the movable unit 5, the optical unit 1 without the object-side casing 46 and the weight 41 is seated on a base 200 having a horizontal mounting surface. That is to say, a swing driving magnet 14 is held at a holding area 50 of the fixed member 44 (i.e., the cylindrical casing 45) such that the swing driving magnet 14 is able to move, and the optical unit 1 is seated on the base 200 while holding a position-recovering magnetic member 15 on the movable unit 5 at a position where the position-recovering magnetic member 15 is able to face the swing driving magnet 14 (Step ST1 of FIG. 15).

Next, parallelism of the +−Z-direction-edge surface 45a (c.f., FIG. 16) of the frame part 48 of the cylindrical casing 45 and the +Z-direction-edge surface 85a (c.f., FIG. 16) of the optical-module-holding part 85 on the optical module holder 71 of the movable unit 5 is obtained in an optical way. Then, the obtained parallelism (i.e., a deviated amount from the state where the +−Z-direction-edge surface 45a of the frame part 48 of the cylindrical casing 45 and the +Z-direction-edge surface 85a of the optical-module-holding part 85 are parallel) is handled as a deviated amount between the axis line L (i.e., the axis line L of the fixed member 44) of the optical unit 1 and the optical axis of the optical module 2 (Step ST2 of FIG. 15).

Subsequently, the swing driving magnet 14 is moved inside the holding area 50 in the Z-axis direction (i.e., in the axis line L direction) by a moving amount based on the obtained deviated amount. In the above way, the position of the movable unit 5 is changed, so as to cause the axis line L and the optical axis of the optical module 2 to correspond to each other (Step ST3 of FIG. 15).

At Step ST3, in a case of moving the swing driving magnet 14 in the +Z direction by the moving amount based on the deviated amount, a jig 201 is inserted to the inside of the cylindrical casing 45 from the outer circumferential side of the cylindrical casing 45 via the radial-direction-opening part 47a, as illustrated in FIG. 16. Then, the −Z-direction-edge surface of the swing driving magnet 14 is abutted by the jig 201. Subsequently, by moving the jig 201 in the +Z direction, the swing driving magnet 14, which is abutted by the jig 201, is moved in the +Z direction.

Hence, between a position-recovering magnetic member 15 and a swing driving magnet 14 being fixed on the movable unit 5, magnetic attractive force is exerted in such a direction that the center of the position-recovering magnetic member 15 is forced toward the side where there is the magnetization-polarized line 14a of the swing driving magnet 14. Therefore, when the swing driving magnet 14 is moved in the +Z direction, the position of the movable unit 5 is displaced in accordance with the movement of the swing driving magnet 14 due to magnetic attractive force exerted between the position-recovering magnetic member 15 and the swing driving magnet 14. In other words, regarding the movable unit 5, the side close to the swing driving magnet 14, which moves in the +Z direction, is displaced to the +Z-direction-side.

Furthermore, at Step ST3, in a case of moving the swing driving magnet 14 in the −Z direction by the moving amount based on the deviated amount, a jig 202 is inserted to the inside of the cylindrical casing 45 from the +Z-direction-side of the cylindrical casing 45 via the axis-direction-opening part 48a, as illustrated in FIG. 16. Then, the +Z-direction-edge surface of the swing driving magnet 14 is abutted by the jig 202. Subsequently, by moving the jig 202 in the −Z direction, the swing driving magnet 14, which is abutted by the jig 202, is moved in the +Z direction.

Here, when the swing driving magnet 14 is moved in the −Z direction, the position of the movable unit 5 to which a position-recovering magnetic member is fixed is displaced in accordance with the movement of the swing driving magnet 14 due to magnetic attractive force exerted between the position-recovering magnetic member 15 and the swing driving magnet 14. In other words, regarding the movable unit 5, the side close to the swing driving magnet 14, which moves in the −Z direction, is displaced to the −Z-direction-side.

Position adjustment of a swing driving magnet 14 is performed by moving one of the four swing driving magnets 14 included in the two swing magnetic driving mechanisms 11A and the two swing magnetic driving mechanisms 11B. In addition, if needed, the position adjustment is performed by moving some of the four swing driving magnets 14 included in the swing magnetic driving mechanisms 11A and the swing magnetic driving mechanism 11B.

Here, regarding the two swing magnetic driving mechanisms 11A, in a case of moving the swing driving magnet 14 included in the swing magnetic driving mechanism 11A of the −X-direction-side in the +Z direction or −Z direction while moving the swing driving magnet 14 included in the swing magnetic driving mechanism 11A of the +X-direction-side in the opposite direction of the Z-axis direction, compared with the swing driving magnet 14 included in the swing magnetic driving mechanism 11A of the −X-direction-side, the reference position of the movable unit 5 becomes stable due to magnetic attractive force exerted between the position-recovering magnetic member 15 and the swing driving magnet 14 included in the swing magnetic driving mechanism 11A of the +X-direction-side and magnetic attractive force exerted between the position-recovering magnetic member 15 and the swing driving magnet 14 included in the swing magnetic driving mechanism 11A of the −X-direction-side.

Furthermore, also regarding the two swing magnetic driving mechanisms 11B, in a case of moving the swing driving magnet 14 included in the swing magnetic driving mechanism 11B of the −Y-direction-side in the +Z direction or −Z direction while moving the swing driving magnet 14 included in the swing magnetic driving mechanism 11B of the +Y-direction-side in the opposite direction of the Z-axis direction, compared with the swing driving magnet 14 included in the swing magnetic driving mechanism 11B of the −Y-direction-side, the reference position of the movable unit 5 becomes stable due to magnetic attractive force exerted between the position-recovering magnetic member 15 and the swing driving magnet 14 included in the swing magnetic driving mechanism 11B of the +Y-direction-side and magnetic attractive force exerted between the position-recovering magnetic member 15 and the swing driving magnet 14 included in the swing magnetic driving mechanism 11B of the −X-direction-side.

When the reference position of the movable unit 5 is defined, the optical unit 1 is placed inside an incubator in a predetermined temperature. In this way, the optical unit 1 is heated, so as to cure the adhesive agent applied to the holding areas 50. As a result, swing driving magnets 14 are fixed to the cylindrical casing 45 at moved positions (Step ST4 of FIG. 15). Once the swing driving magnets 14 are fixed to the cylindrical casing 45 by the adhesive agent, the swing driving magnets 14 are not displaced even when external force is imposed on the optical unit 1. Hence, even external force is imposed on the optical unit 1, it is possible to prevent the reference position of the movable unit 5 from changing. Subsequently, the object-side casing 46 is fixed to the cylindrical casing 45. Further, the weight 41 is attached to the movable unit 5, so as to cause the center of gravity of the movable unit 5 and the center of swing of the movable unit 5 (i.e., the first axis R1 and the second axis R2), which is caused by the swing-supporting mechanism 6, to correspond to each other.

Note that it is possible to monitor the parallelism of the +−Z-direction-edge surface 45a of the frame part 48 of the cylindrical casing 45 and the +Z-direction-edge surface 85a of the optical-module-holding part 85 of the movable unit 5 at the same time as the operation of moving a swing driving magnet 14 in the Z-axis direction, and then stops moving the swing driving magnet 14 when the edge surface 45a and the edge surface 85a are parallel to each other, so as to fix the swing driving magnet 14 to the cylindrical casing 45 at the moved position.

Furthermore, although the operation of the position adjustment from Step ST1 through Step ST4 are performed while the weight 41 is not attached to the movable unit 5 in the above embodiment, the operation of the position adjustment may be performed after the weight 41 is attached to the movable unit 5. In other words, although the weight 41 is attached to the movable unit 5, so as to cause the center of gravity of the movable unit 5 and the center of swing of the movable unit 5, which is caused by the swing-supporting mechanism 6, to correspond to each other after defining the reference position of the movable unit 5 in the above embodiment, the reference position of the movable unit 5 may be defined by moving the swing driving magnets 14 after attaching the weight 41 to the movable unit 5, so as to cause the center of gravity of the movable unit 5 and the center of swing of the movable unit 5, which is caused by the swing-supporting mechanism 6.

(Functional Effect)

In the present embodiment, it is possible to define a reference position of the movable unit 5 by moving a swing driving magnet 14, which configures the position-recovering mechanism 12, in the Z-axis direction (i.e., the axis line L direction). Furthermore, the swing driving magnet 14 is fixed to the cylindrical casing 45 using an adhesive agent after defining the reference position of the movable unit 5. Therefore, even when external force is imposed on the optical unit 1, the swing driving magnet 14 does not change and it is possible to prevent the reference position of the movable unit 5 from changing.

Furthermore, in the present embodiment, the swing driving magnet 14 is moved when adjusting the reference position of the movable unit 5, and therefore it is easy to adjust the reference position of the movable unit 5. In other words, although it is also possible to adjust a position of the movable unit 5 by moving a position-recovering magnetic member 15 held by the movable unit 5, it is easier to move a position-recovering magnetic member 14 held by a fixed member (i.e., the cylindrical casing 45) rather than moving the position-recovering magnetic member 15 held by a swingable member (i.e., the movable unit 5). Furthermore, as a swing driving magnet 14 is larger than a position-recovering magnetic member 15, a swing driving magnet 14 is easily abutted by jigs 201 and 202.

Furthermore, as the cylindrical casing 45 is made of magnetic material and a swing driving magnet 14 is held by the cylindrical casing 45 while being magnetically attracted, it is possible to move the swing driving magnet 14 inside a holding area 50 of the cylindrical casing 45. Furthermore, as the cylindrical casing 45 is made of magnetic material, the cylindrical casing 45 functions as a back yoke of the cylindrical casing 45. Hence, torque generated by the swing magnetic driving mechanism 11 is enhanced.

Furthermore, in the present embodiment, the cylindrical casing 45 includes a radial-direction-opening part 47a to which a jig 201 is inserted, and therefore it is easy to move a swing driving magnet 14, which is held on the inner wall surface of the cylindrical casing 45, in the Z-axis direction from the outer circumferential side of the cylindrical casing 45. Furthermore, the cylindrical casing 45 includes an axis-direction-opening part 48a to which a jig 202 is inserted, and therefore it is easy to move a swing driving magnet 14, which is held on the inner wall surface of the cylindrical casing 45, in the Z-axis direction from the outside of the cylindrical casing 45, which is in the +Z direction.

(Variation Example)

Although, in the above example, a swing driving magnet 14 is moved in the Z-axis direction for adjusting the position of the movable unit 5, it is possible that a position-recovering magnetic member 15 is moved in the Z-axis direction inside a magnetic-member-fixation area 92 (i.e., a groove 93) for adjusting the position of the movable unit 5.

Furthermore, regarding the above example, it is possible that, on the inner wall surface of the cylinder part 47 of the cylindrical casing 45, there is provided a guide part that extends in the Z-axis direction at a position adjacent to a holding area 50 in the circumferential direction around the Z axis, such that the guide part abuts a swing driving magnet 14, which is held by the holding area 50, from the outer circumferential direction. In the above way, when the swing driving magnet 14 is abutted by jigs 201 and 202 and moved in the Z-axis direction, it is possible to move the swing driving magnet 14 along the guide part. Therefore, it is possible to move the swing driving magnet 14 in the Z-axis direction while maintaining the position of the swing driving magnet 14. Note that it is also possible to set the width-dimension of a swing driving magnet 14 in the circumferential direction as same as the dimension of each of the side-plates 51~54 of the cylinder part 47 in the circumferential direction such that the edge of the side-plates 55 which is adjacent to each of the side-plates 51~54 in the circumferential direction function as a guide part that guides the swing driving magnet 14 in the Z-axis direction.

Note that, although there are one radial-direction-opening part 47a and one axis-direction-opening part 48b, respectively, to which jigs 201 and 202 are inserted to move one swing driving magnet 14 in the above example, there may be two or more opening parts apart from each other in the circumferential direction. In the above way, it is possible that the jigs 201 and 202, which are inserted from two or more radial-direction-opening parts 47a and two or more axis-direction-opening parts 48b, abut two positions on the Z-axis-direction-edge surface of a swing driving magnet 14. Therefore, when moving the jigs 201 and 202 in the Z-axis direction, it is possible to move the swing driving magnet 14 in the Z-axis direction while keeping the position of the swing driving magnet 14 stable.

Figure 17:
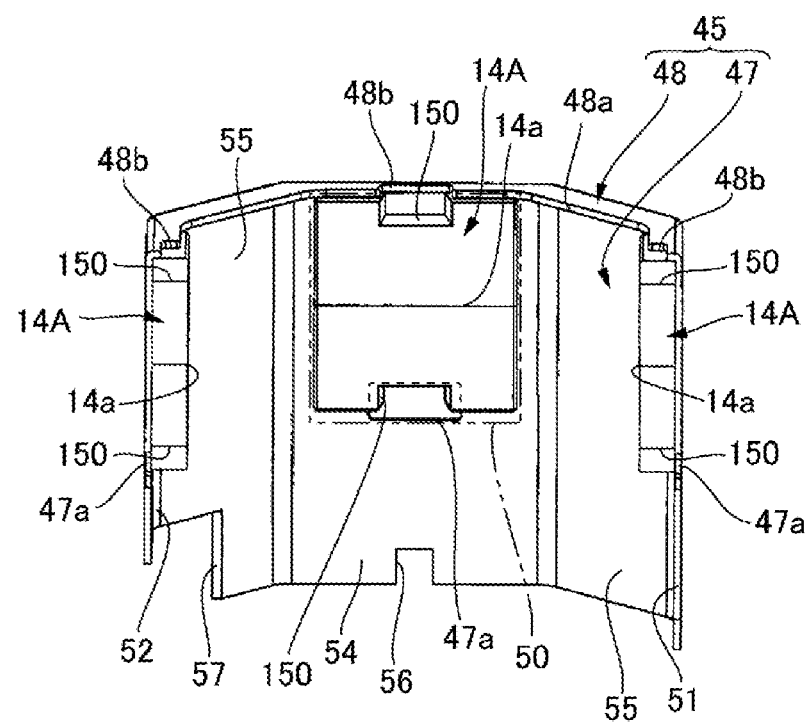
FIG. 17 is an explanatory diagram of a swing driving magnet according to a variation example.

Furthermore, there may be provided with abutted parts that are abutted by the jigs 201 and 202 on the swing driving magnet 14. FIG. 17 is an explanatory diagram of a variation example of swing driving magnets, in which abutted parts are provided. In the present example, a swing driving magnet 14A is provided, on both Z-axis-direction-edge surfaces, with depression parts 150 depressing respectively in the Z-axis direction. Therefore, the inner wall surface of the depression parts 150 are abutted parts that are abutted by the jigs 201 and 202, respectively. In the above way, it is possible that the jigs 201 and 202 precisely abut the swing driving magnet 14. Therefore, it is possible to precisely move the swing driving magnet 14 by moving the jigs 201 and 202.

Other Embodiment

The swing magnetic driving mechanism 11 may be configured such that a swing driving magnet 14 is held by the movable unit 5 and a swing driving coil 13 is held by the fixed member 44 (i.e., the cylindrical casing 45). In this case, a position-recovering magnetic member 15 is held by the fixed member 44 (i.e., the cylindrical casing 45) and configures the position-recovering mechanism 12, in combination with the swing driving magnet 14 on the movable unit 5. Furthermore, in this case as well, it is possible to perform position adjustment of the movable unit 5 by moving at least one of the swing driving magnet 14 and the position-recovering magnetic member 15 in the Z-axis direction.

Note that the first unit 3 in the present example may be used as an optical unit 1 with shake correction function that swing the movable unit 5 on the first axis R1 and on the second axis R2, without assembling with the second unit 4. In this case, either one of the cylindrical casing 45 and the object-side casing 46 (i.e., the fixed member) may double as a holder 7 (i.e., a supporting member). That is to say, the holder 7 is left out, and additionally a second swing-supporting part 102 is provided at a diagonal position on the second axis R2 (i.e., the second axis line L) of the cylindrical casing 45 or the object-side casing 46 (i.e., the fixed member 44). Furthermore, a movable frame 3 is placed between the first swing-supporting part 101 provided on the movable unit 5 and the second swing-supporting part 102 provided on the cylindrical casing 45 or the object-side casing 16, so as to configure the swing-supporting mechanism 6.

What is claimed is:

1. A method for adjusting a position of a swing member of an optical unit with a shake correction function, the optical unit including:
    the swing member including an optical element;
    a swing-supporting mechanism configured to support the swing member in such a manner that the swing member is able to swing between a reference position, in which a predetermined axis line and an optical axis of the optical element correspond to each other, and a tilting position, in which the optical axis tilts relative to the axis line by a predetermined angle;
    a supporting member configured to support the swing member via the swing-supporting mechanism;
    a swing magnetic driving mechanism configured to cause the swing member to swing; and
    a fixed member configured to enclose the swing member from an outer circumferential side,
    wherein the swing magnetic driving mechanism includes a coil and a magnet, the coil being fixed to either one of the swing member and the fixed member, the magnet being held by the other one of the swing member and the fixed member, wherein the magnet is magnetized in such a manner that the magnet is polarized in two in an axis line direction, and wherein the method comprises:
holding a magnetic member on one of the swing member and the fixed member, the coil being fixed to the one of the swing member and the fixed member, the magnetic member being at a position that overlaps the magnet when seen in a radial direction orthogonal to the axis line;
moving the magnetic member or the magnet in the axis line direction, so as to cause the optical axis and the axis line to correspond to each other; and
fixing the magnetic member or the magnet to a position to which the magnetic member or the magnet has been moved.

2. The method for adjusting the position of the swing member of the optical unit with the shake correction function according to claim 1,
wherein the magnet is held on the fixed member; and
wherein the magnet is moved in the axis line direction, so as to cause the optical axis of the swing member and the axis line to correspond to each other.

3. The method for adjusting the position of the swing member of the optical unit with the shake correction function according to claim 1,
wherein the fixed member includes a cylinder member made of magnetic material and enclosing the swing member from an outer side of the radial direction, the cylinder member including, on an inner wall surface facing the swing member, a holding area that holds the magnet in such a manner that the magnet is able to move in the axis line direction, and
wherein the magnet is held inside the holding area and is moved in the axis line direction, so as to cause the optical axis of the swing member and the axis line to correspond to each other.

4. The method for adjusting the position of the swing member of the optical unit with the shake correction function according to claim 2,
wherein the fixed member includes a cylinder member made of magnetic material and enclosing the swing member from an outer side of the radial direction, the cylinder member including, on an inner wall surface facing the swing member, a holding area that holds the magnet in such a manner that the magnet is able to move in the axis line direction, and
wherein the magnet is held inside the holding area and is moved in the axis line direction, so as to cause the optical axis of the swing member and the axis line to correspond to each other.

5. The method for adjusting the position of the swing member of the optical unit with the shake correction function according to claim 3,
wherein the cylinder member includes a radial-direction-opening part that penetrates through the cylinder member in the radial direction, and
wherein a first jig is inserted from the radial-direction-opening part to an inside of the cylinder member and is moved while the first jig is abutting the magnet, so as to move the magnet in the axis line direction.

6. The method for adjusting the position of the swing member of the optical unit with the shake correction function according to claim 5,
wherein the cylinder member includes
a cylinder part provided with the holding area and the radial-direction-opening part and
a frame part protruding inward from one of axis-direction-edges of the cylinder part,
wherein the frame part includes an axis-direction-opening part at a position facing the magnet, which is held in the holding area, in the axis line direction, and
wherein a second jig is inserted from the axis-direction-opening part to the cylinder part and is moved while the second jig is abutting the magnet, so as to move the magnet in the axis line direction.

7. The method for adjusting the position of the swing member of the optical unit with the shake correction function according to claim 1,
wherein the swing magnetic driving mechanism includes a first swing magnetic driving mechanism and a second swing magnetic driving mechanism, which are disposed on sides with the axis line therebetween,
wherein the magnetic member includes a first magnetic member and a second magnetic member, the first magnetic member being held by one of the swing member and the fixed member where the coil of the first swing magnetic driving mechanism being fixed and at a position that overlaps the magnet of the first swing magnetic driving mechanism when seen in the radial direction, the second magnetic member being held by one of the swing member and the fixed member where the coil of the second swing magnetic driving mechanism being fixed and at a position that overlaps the magnet of the second swing magnetic driving mechanism when seen in the radial direction, and
wherein the magnet of the first swing magnetic driving mechanism or the first magnetic member is moved in the axis line direction and the magnet of the second swing magnetic driving mechanism or the second magnetic member is moved in the axis line direction, so as to cause the optical axis of the swing member and the axis line to correspond to each other.

8. The method for adjusting the position of the swing member of the optical unit with the shake correction function according to claim 7,
wherein the swing magnetic driving mechanism includes a third swing magnetic driving mechanism and a fourth swing magnetic driving mechanism, the third swing magnetic driving mechanism being disposed at an angular position around the axis line between the first swing magnetic driving mechanism and the second swing magnetic driving mechanism, the fourth swing magnetic driving mechanism being disposed on an opposite side of the third swing magnetic driving mechanism with the axis line therebetween,
wherein the magnetic member includes a third magnetic member and a fourth magnetic member, the third magnetic member being held by one of the swing member and the fixed member where the coil of the third swing magnetic driving mechanism being fixed and at a position that overlaps the magnet of the third swing magnetic driving mechanism when seen in the radial direction, the fourth magnetic member being held by one of the swing member and the fixed member where the coil of the fourth swing magnetic driving mechanism being fixed and at a position that overlaps the magnet of the fourth swing magnetic driving mechanism when seen in the radial direction, and
wherein the magnet of the third swing magnetic driving mechanism or the third magnetic member is moved in the axis line direction and the magnet of the fourth swing magnetic driving mechanism or the fourth magnetic member is moved in the axis line direction, so as to cause the optical axis of the swing member and the axis line to correspond to each other.

9. The method for adjusting the position of the swing member of the optical unit with the shake correction function according to claim 1, wherein the fixed member doubles as the supporting member.

10. The method for adjusting the position of the swing member of the optical unit with the shake correction function according to claim 8, wherein the fixed member doubles as the supporting member.

11. An optical unit with a shake correction function, the optical unit comprising:
- a swing member including an optical element;
- a swing-supporting mechanism configured to support the swing member in such a manner that the swing member is able to swing between a reference position, in which a predetermined axis line and an optical axis of the optical element correspond to each other, and a tilting position, in which the optical axis tilts relative to the axis line by a predetermined angle;
- a supporting member configured to support the swing member via the swing-supporting mechanism;
- a swing magnetic driving mechanism configured to cause the swing member to swing; and
- a fixed member configured to enclose the swing member from an outer circumferential side, wherein the swing magnetic driving mechanism includes a coil and a magnet, the coil being fixed to either one of the swing member and the fixed member, the magnet being held by the other one of the swing member and the fixed member, wherein the magnet is magnetized in such a manner that the magnet is polarized in two in an axis line direction, wherein the fixed member includes a cylinder member made of magnetic material and enclosing the swing member from an outer side, and wherein the cylinder member includes, on an inner wall surface facing the swing member,
- a holding area that holds the magnet in such a manner that the magnet is able to move in the axis line direction and
- a radial-direction-opening part that allows a first jig to abut the magnet held by the holding area from an outside of the cylinder member.

12. The optical unit with a shake correction function according to claim 11,
wherein the cylinder member includes
- a cylinder part provided with the holding area and the radial-direction-opening part,
- a frame part protruding inward from one of axis-direction-edges of the cylinder part, and
- an axis-direction-opening part that allows a second jig to abut the magnet held by the holding area from the outside of the cylinder member, and wherein the axis-direction-opening part is provided on the frame part at a position facing the magnet, which is held in the holding area, in the axis line direction.

13. The optical unit with a shake correction function according to claim 11, wherein the fixed member doubles as the supporting member.

14. The optical unit with a shake correction function according to claim 12, wherein the fixed member doubles as the supporting member.

* * * * *